US012288372B2

(12) United States Patent
Bangalath et al.

(10) Patent No.: US 12,288,372 B2
(45) Date of Patent: Apr. 29, 2025

(54) SYSTEM AND METHOD OF BRIDGING THE GAP BETWEEN OBJECT AND IMAGE-LEVEL REPRESENTATIONS FOR OPEN-VOCABULARY DETECTION

(71) Applicant: Mohamed bin Zayed University of Artificial Intelligence, Abu Dhabi (AE)

(72) Inventors: Hanoona Abdul Rasheed Bangalath, Abu Dhabi (AE); Muhammad Maaz, Abu Dhabi (AE); Muhammad Uzair Khattak, Abu Dhabi (AE); Salman Khan, Abu Dhabi (AE); Fahad Shahbaz Khan, Abu Dhabi (AE)

(73) Assignee: Mohamed bin Zayed University of Artificial Intellegence, Abu Dhabi (AE)

( * ) Notice: Subject to any disclaimer, the term of this patent is extended or adjusted under 35 U.S.C. 154(b) by 386 days.

(21) Appl. No.: 18/085,048

(22) Filed: Dec. 20, 2022

(65) Prior Publication Data

US 2024/0203085 A1    Jun. 20, 2024

(51) Int. Cl.
*G06V 10/25* (2022.01)
*G06T 1/00* (2006.01)
(Continued)

(52) U.S. Cl.
CPC ............ *G06V 10/25* (2022.01); *G06T 1/0021* (2013.01); *G06V 10/70* (2022.01); *G06V 20/56* (2022.01); *G06V 2201/07* (2022.01)

(58) Field of Classification Search
CPC ........ G06V 10/25; G06V 10/70; G06V 20/56; G06V 2201/07; G06T 1/0021
See application file for complete search history.

(56) References Cited

U.S. PATENT DOCUMENTS 11,532,168 B2 * 12/2022 Smolyanskiy .... B60W 60/0027
11,631,233 B2 *  4/2023 Patel ..................... G06V 10/225
                                                                382/157
(Continued)

FOREIGN PATENT DOCUMENTS

EP          3 540 634 A1      9/2019
WO      WO-2023242761 A1 * 12/2023

OTHER PUBLICATIONS

Karpathy, A., & Fei-Fei, L. (2015). Deep visual-semantic alignments for generating image descriptions. In Proceedings of the IEEE conference on computer vision and pattern recognition (pp. 3128-3137).*

(Continued)

*Primary Examiner* — Shefali D Goradia
(74) *Attorney, Agent, or Firm* — Oblon, McClelland, Maier & Neustadt, L.L.P.

(57) ABSTRACT

An object detection system and method in which a machine learning engine is configured with a region-based knowledge distillation stage that generates region embeddings from a training image having bounding boxes. A linear layer learns a region-level vision-language mapping for projecting feature embeddings from the training image to a common feature space shared by text embeddings to obtain the region embeddings. An image-level supervision stage generates pseudo-box labels for a classification training image and region embeddings from the training image having bounding boxes and corresponding class labels and the classification training image having an image-level label as input. Pseudo-box labels are determined on the classification training image as an image-level vision-language mapping. A weight transfer function conditions the image-level vision-language mapping on the learned region-level vision-language map-
(Continued)

ping. A trained object detector outputs a newly captured image annotated with a bounding box for a novel object.

20 Claims, 28 Drawing Sheets

(51) Int. Cl.
*G06V 10/70* (2022.01)
*G06V 20/56* (2022.01)

(56) References Cited

U.S. PATENT DOCUMENTS

2020/0285879 A1* 9/2020 Cheng .................. G06V 10/768
2022/0026917 A1* 1/2022 Beijbom .............. G05D 1/0251

OTHER PUBLICATIONS

Maaz, et al.; Class-agnostic Object Detection with Multi-modal Transformer; Mohamed bin Zayed University of AI, Australian National University; Jul. 19, 2022; 31 Pages.
Khattak, et al.; Maple: Multi-Modal Prompt Learning; Mohamed bin Zayed University of AI, Australian National University, Linkoping University; Oct. 6, 2022; 16 Pages.
Zhong, et al.; DAP: Detection-Aware Pre-training with Weak Supervision; University of Illinois at Urbana-Champaign, Microsoft; Mar. 30, 2021 ; 13 Pages.

* cited by examiner

SYSTEM AND METHOD OF BRIDGING THE GAP BETWEEN OBJECT AND IMAGE-LEVEL REPRESENTATIONS FOR OPEN-VOCABULARY DETECTION

STATEMENT REGARDING PRIOR DISCLOSURE BY THE INVENTORS

Aspects of this technology are described in Rasheed, Hanoona, Muhammad Maaz, Muhammad Uzair Khattak, Salman Khan, and Fahad Shahbaz Khan. "Bridging the gap between object and image-level representations for open-vocabulary detection." *arXiv preprint arXiv:* 2207.03482 (2022), and is incorporated herein by reference in its entirety. The code along with pre-trained models are publicly available at: github.com/hanoonaR/object-centric-ovd.

BACKGROUND

Technical Field

The present disclosure is directed to open-vocabulary detection (OVD), particularly for expanding object detection in image scenes. The OVD is a method of training a deep neural network in a manner that bridges a gap between object and image-level representations by way of a weight transfer function that aggregates their complementary strengths. The method includes object-centric alignment of language embeddings and image-level supervision that involves a pseudo-labeling process for obtaining high-quality object proposals and expanding the object vocabulary during training.

Description of Related Art

Locating and identifying densely packed objects in natural scenes is a daunting task. Existing detection datasets (for objects in an image) are of substantially smaller magnitude compared to the classification datasets (classification of the image), which are easier to annotate. As an example, the COCO dataset for object detection currently has about 330K images, of which there are greater than 200K labeled images. Within these images, there are about 1.5 million object instances in 80 object categories. In contrast, the ImageNet-21K dataset for image classification currently has about 14 million images that are tagged by one of about 21,000 classes. A reason for the substantially difference is the manpower cost to annotate objects in images, as well as a lack of a vocabulary for expanding to large scale object types.

One area where object detection is crucial is driver assist systems that rely on cameras, and eventually self-driving or autonomous vehicles. Autonomous vehicles (AV) have a main task of robust environmental perception to detect objects in the vicinity of the autonomous vehicle. Object detection is a task that is critical for localizing and recognizing objects such as pedestrians, traffic lights/signs, other vehicles, and barriers in the AV vicinity. In addition, object detection is a foundation for high-level tasks during AV operation, such as object tracking, event detection, motion control, and path planning. As such, AVs rely heavily on object detectors for perception, pathfinding, and other decision making. However, the state of the art object detectors are far from sufficient for AV tasks.

Companies that are developing autonomous vehicle technology have only begun to touch the surface of roads and natural scenes that an autonomous vehicle will encounter. As an example, Cadillac has mapped over 200,000 miles of highway in North America, covering a vast majority of the country's main interstate system. Still, there are over 4 million miles of road in the United States alone.

Companies like Tesla have developed software that is good at recognizing common objects such as cars, stop signs, pedestrians, bikes, traffic lights, and some basic obstacles. The Society of Automotive Engineers (SAE) has divided advanced driver assist (ADAS) systems into six levels. ADAS that are considered level 1 are: adaptive cruise control, emergency brake assist, automatic emergency brake assist, lane-keeping, and lane centering.en.wikipedia.org/wiki/Advanced_driver-assistance_system ADAS that are considered level 2 are: highway assist, autonomous obstacle avoidance, and autonomous parking.en.wikipedia.org/wiki/Advanced_driver-assistance_system From level 3 to 5, the amount of control the vehicle has increases; level 5 being where the vehicle is fully autonomous. Currently, Tesla's Autopilot, which is a suite of advanced driver-assistance (ADAS) features, is rated at SAE International Level 2 vehicle automation. Subsequently, the level of ADAS in Tesla vehicles involves a level of object recognition that does not constitute anything close to "full self-driving".

Even a seemingly simple task of traffic sign recognition is a challenge for computer vision systems. Traffic sign recognition systems recognize common traffic signs though image processing techniques that take into account the sign's shape, such as hexagons and rectangles, and the color to classify the sign. These systems use cameras that encounter a wide variety of factors that can make the system less accurate. These factors include poor lighting conditions, extreme weather conditions, and partial obstruction of the sign.

To address the limited amount of data for training of object detectors, an approach known as Open-Vocabulary Detection (OVD) aims to generalize beyond the limited number of base object classes labeled during the training phase. The goal is to detect novel object classes defined by an unbounded (open) vocabulary at inference. Owing to the challenging nature of the OVD task, different forms of weak-supervision for novel categories are typically used.

Weak-supervision is an approach to machine learning in which high-level and often noisier sources of supervision are used to create much larger training sets much more quickly than could otherwise be produced by manual supervision (i.e. labeling examples manually, one by one). Forms of weak-supervision include, e.g., extra image-caption pairs to enlarge the vocabulary, image-level labels on classification datasets and pretrained open-vocabulary classification models like CLIP. See Alireza Zareian, Kevin Dela Rosa, Derek Hao Hu, and Shih-Fu Chang. Open-vocabulary object detection using captions. In *Proceedings of the IEEE CVF Conference on Computer Vision and Pattern Recognition,* 2021: Xingyi Zhou, Rohit Girdhar, Armand Joulin, Phillip Krähenbühl, and Ishan Misra. Detecting twenty-thousand classes using image-level supervision. *arXiv preprint arXiv:* 2201.02605, 2022; and Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In *International Conference on Machine Learning,* 2021, each incorporated herein by reference in their entirety.

The use of weak-supervision to enlarge the vocabulary is intuitive as the cost of annotating large-category object detection datasets is monumental while the image-text/label pairs are readily available via large classification datasets or internet sources. See Jia Deng, Wei Dong, Richard Socher, Li-Jia Li, Kai Li, and Li Fei-Fei. Imagenet: A large-scale hierarchical image database. In *Proceedings of the IEEE CVF Conference on Computer Vision and Pattern Recognition*. Ieee, 2009; Radford et al.; and Chao Jia, Yinfei Yang, Ye Xia, Yi-Ting Chen, Zarana Parekh, Hieu Pham, Quoc Le, Yun-Hsuan Sung, Zhen Li, and Tom Duerig. Scaling up visual and vision-language representation learning with noisy text supervision. In *International Conference on Machine Learning*. PMLR, 2021, each incorporated herein by reference in their entirety.

One of the major challenges with enlarging vocabulary via image-level supervision (ILS) or pretrained models learned using ILS is the inherent mis-match between region and image-level cues. For instance, pretrained contrastive language-image pre-training (CLIP) embeddings used in the existing OVD models do not perform well in locating object regions since the CLIP model is trained with full images. See Xiuye Gu, Tsung-Yi Lin, Weicheng Kuo, and Yin Cui. Open-vocabulary object detection via vision and language knowledge distillation. *International Conference on Learning Representations*, 2022: Zhou et al. (2022); and Yiwu Zhong, Jianwei Yang, Pengchuan Zhang, Chunyuan Li, Noel Codella, Liunian Harold Li, Luowei Zhou, Xiyang Dai, Lu Yuan, Yin Li, et al. Regionclip: Region-based language-image pretraining. *arXiv preprint arXiv:* 2112.09106, 2021, each incorporated herein by reference in their entirety. Similarly, weak supervision on images using caption descriptions or image-level labels does not convey the precise object-centric information. For label grounding in images, the recent literature explores expensive pretraining with auxiliary objectives or use heuristics such as, the max-score or max-size boxes.

Several approaches, such as zero-shot object detection, weakly-supervised object detection, and open vocabulary object detection, are being pursued.

Zero-shot Object Detection (ZSD) involves detecting novel class objects at inference, for which no visual examples are available during training. Zhu et al. use semantic information with visual features to get proposals for both seen and unseen classes. See Pengkai Zhu, Hanxiao Wang, and Venkatesh Saligrama. Zero shot detection. *IEEE Transactions on Circuits and Systems for Video Technology*, 2019, incorporated herein by reference in its entirety. Bensal et al. show that learning a good separation between background and foreground is critical in ZSD and propose to use multiple latent classes for modeling background during training. See Ankan Bansal, Karan Sikka, Gaurav Sharma, Rama Chellappa, and Ajay Divakaran. Zero-shot object detection. In *The European Conference on Computer Vision*, 2018, incorporated herein by reference in its entirety. Rahman et al. propose a polarity loss to solve the ambiguity between background and unseen classes. See Shafin Rahman, Salman Khan, and Nick Barnes. Improved visual-semantic alignment for zero-shot object detection. In *Association for the Advancement of Artificial Intelligence*, 2020, incorporated herein by reference in its entirety. DELO focuses on generating good proposals for unseen classes by synthesizing visual features for unseen objects using a generative model. See Pengkai Zhu, Hanxiao Wang, and Venkatesh Saligrama. Don't even look once: Synthesizing features for zero-shot detection. In *Proceedings of the IEEE CVF Conference on Computer Vision and Pattern Recognition*, 2020, incorporated herein by reference in its entirety. Gupta et al. benefits from the contemporary cues in semantic and visual space ensuring better class separation for ZSD. See Dikshant Gupta, Aditya Anantharaman, Nehal Mamgain, Vineeth N Balasubramanian, CV Jawahar, et al. A multi-space approach to zero-shot object detection. In *Proceedings of the IEEE CVF Winter Conference on Applications of Computer Vision*, 2020, incorporated herein by reference in its entirety. Other works use additional learning signals, including unlabeled images from target domain and raw textual descriptions from the internet. See Shafin Rahman, Salman Khan, and Nick Barnes. Transductive learning for zero-shot object detection. In *Proceedings of the IEEE CVF Conference on Computer Vision and Pattern Recognition*, 2019; and Zhihui Li, Lina Yao, Xiaoqin Zhang, Xianzhi Wang, Salil Kanhere, and Huaxiang Zhang. Zero-shot object detection with textual descriptions. In *Association for the Advancement of Artificial Intelligence*, 2019, each incorporated herein by reference in their entirety.

In Weakly-Supervised Object Detection (WSOD) only image-level labels are used to approach object detection, or are used alongside a detection dataset to enlarge the object detector vocabulary. See Yunhang Shen, Rongrong Ji, Yan Wang, Zhiwei Chen, Feng Zheng, Feiyue Huang, and Yunsheng Wu. Enabling deep residual networks for weakly supervised object detection. In *The European Conference on Computer Vision*, 2020; Yunhang Shen, Rongrong Ji, Yan Wang, Yongjian Wu, and Liujuan Cao. Cyclic guidance for weakly supervised joint detection and segmentation. In *Proceedings of the IEEE CVF Conference on Computer Vision and Pattern Recognition*, 2019] Fang Wan, Chang Liu, Wei Ke, Xiangyang Ji, Jianbin Jiao, and Qixiang Ye. C-mil: Continuation multiple instance learning for weakly supervised object detection. In *Proceedings of the IEEE CVF Conference on Computer Vision and Pattern Recognition*, 2019; Ke Yang, Dongsheng Li, and Yong Dou. Towards precise end-to-end weakly supervised object detection network. In *Proceedings of the IEEE/CVF International Conference on Computer Vision*, 2019; Yuanyi Zhong, Jianfeng Wang, Jian Peng, and Lei Zhang. Boosting weakly supervised object detection with progressive knowledge transfer. In *The European Conference on Computer Vision*, 2020; Ziang Yan, Jian Liang, Weishen Pan, Jin Li, and Changshui Zhang. Weakly- and semi-supervised object detection with expectation-maximization algorithm. *arXiv preprint arXiv:* 1702.08740, 2017; Bowen Dong, Zitong Huang, Yuelin Guo, Qilong Wang, Zhenxing Niu, and Wangmeng Zuo. Boosting weakly supervised object detection via learning bounding box adjusters. In *Proceedings of the IEEE CVF International Conference on Computer Vision*, 2021; and Shijie Fang, Yuhang Cao, Xinjiang Wang, Kai Chen, Dahua Lin, and Wayne Zhang. Wssod: A new pipeline for weakly- and semi-supervised object detection. *arXiv preprint ar Xiv:* 2105.11293, 2021, each incorporated herein by reference in their entirety. Bilen et al. proposed a weakly-supervised deep detection network (WSDNN) that uses off-the-shelf region proposals and computes objectness and recognition scores for each proposal using separate subnetworks. See Hakan Bilen and Andrea Vedaldi. Weakly supervised deep detection networks. In *Proceedings of the IEEE CVF Conference on Computer Vision and Pattern Recognition*, 2016: Jasper R R Uijlings, Koen E A Van De Sande, Theo Gevers, and Arnold W M Smeulders. Selective search for object recognition. *International Journal of Computer Vision*, 104(2): 154-171, 2013; and C Lawrence Zitnick and Piotr Dollár. Edge Boxes: Locating Object Proposals from Edges. In *The European Conference on Computer Vision*. Springer, 2014, each incorporated herein by reference in their entirety. A network architecture referred to as Cap2Det operates in a similar setting and uses raw text captions to generate pseudo-labels to guide image-level supervision. See Keren Ye, Mingda Zhang, Adriana Kovashka, Wei Li, Danfeng Qin, and Jesse Berent. Cap2det: Learning to amplify weak caption supervision for object detection. In *Proceedings of the IEEE/CVF International Conference on Computer Vision,* 2019, incorporated herein by reference in its entirety. Li et al. uses segmentation-detection collaborative network (SDCN) for accurate detection under a weakly-supervised setting using only image labels. See Xiaoyan Li, Meina Kan, Shiguang Shan, and Xilin Chen. Weakly supervised object detection with segmentation collaboration. In *Proceedings of the IEEE CVF International Conference on Computer Vision,* 2019, incorporated herein by reference in its entirety. PCL proposes to cluster the spatially adjacent proposals and then assign image labels to each cluster. See Peng Tang, Xinggang Wang, Song Bai, Wei Shen, Xiang Bai, Wenyu Liu, and Alan Yuille. Pcl: Proposal cluster learning for weakly supervised object detection. *IEEE Transactions on Pattern Analysis and Machine Intelligence,* 2018, incorporated herein by reference in its entirety. A work referred to as comprehensive attention self-distillation (CASD) argues that the detectors trained only with image-level labels are prone to detect boxes around salient objects and propose feature attention along with self-distillation to address the issue. See Zeyi Huang, Yang Zou, BVK Kumar, and Dong Huang. Comprehensive attention self-distillation for weakly-supervised object detection. Advances in Neural Information *Processing Systems,* 2020, incorporated herein by reference in its entirety. YOLO9000 and DLWL augments the detection training by assigning image-level labels to the max-score proposal. See Joseph Redmon and Ali Farhadi. Yolo9000: better, faster, stronger. In *Proceedings of the IEEE CVF Conference on Computer Vision and Pattern Recognition,* 2017; and Vignesh Ramanathan, Rui Wang, and Dhruv Mahajan. Dlwl: Improving detection for lowshot classes with weakly labelled data. In *Proceedings of the IEEE CVF Conference on Computer Vision and Pattern Recognition,* 2020, each incorporated herein by reference in their entirety. Detic shows that using max-size proposal is an optimal choice for assigning image-level labels as it does not rely on the predictions of the network being optimized and provides better signals for the novel classes.

In Open-vocabulary Object Detection (OVD), the objective is to detect target class objects not present in the training/base class vocabulary. A typical solution of the problem is to replace the classifier weights with text embeddings of the target vocabulary (e.g., GloVe, BERT, CLIP). See Jeffrey Pennington, Richard Socher, and Christopher D Manning. Glove: Global vectors for word representation. In *Conference on Empirical Methods in Natural Language Processing,* 2014: Jacob Devlin, Ming-Wei Chang, Kenton Lee, and Kristina Toutanova. Bert: Pre-training of deep bidirectional transformers for language understanding. *ar Xiv preprint ar Xiv:* 1810.04805, 2018; and Radford et al., each incorporated herein by reference in their entirety. For example, OVR-RCNN uses BERT embeddings as classifier weights and proposes to use open-vocabulary captions to learn the vision-to-language mapping. It surpasses the ZSD approaches by a large margin. In another example, VILD uses pretrained CLIP to distill knowledge into a two-stage object detector and replaces the classifier weights with CLIP text embeddings obtained by ensembling multiple text prompts (e.g., a {category}, a photo of a {category}). See Gu et al.: Radford et al.; and Shaoqing Ren, Kaiming He, Ross Girshick, and Jian Sun. Faster R-CNN: Towards Real-Time Object Detection with Region Proposal Networks. *Advances in Neural Information Processing Systems,* 28, 2015, each incorporated herein by reference in their entirety. Gao et al. generate pseudo bounding-box labels using pretrained VL models for training open-vocabulary detector. See Mingfei Gao, Chen Xing, Juan Carlos Niebles, Junnan Li, Ran Xu, Wenhao Liu, and Caiming Xiong. Towards open vocabulary object detection without human-provided bounding boxes. *arXiv preprint ar Xiv:* 2111.09452, 2021, incorporated herein by reference in its entirety. All these methods use carefully designed manual prompts for generating text embeddings. DetPro and PromptDet replace these manual prompts with learnable tokens and achieve competitive results on novel/rare categories. See Yu Du, Fangyun Wei, Zihe Zhang, Miaojing Shi, Yue Gao, and Guoqi Li. Learning to prompt for open-vocabulary object detection with vision-language model. *arXiv preprint arXiv:* 2203.14940, 2022; and Chengjian Feng, Yujie Zhong, Zequn Jie, Xiangxiang Chu, Haibing Ren, Xiaolin Wei, Weidi Xie, and Lin Ma. Promptdet: Expand your detector vocabulary with uncurated images. *arXiv preprint arXiv:* 2203.16513, 2022, each incorporated herein by reference in their entirety.

These approaches have pitfalls that are addressed in the present object detector. Although significant progress has been made on zero-shot object detection, the inherent complexity of the task makes it challenging for the ZSD models to generalize well to unseen object classes. In weakly-supervised object detection, only image-level labels are used to approach object detection, or are used alongside the detection dataset to enlarge the detector vocabulary. A conventional solution to OVD is to replace classifier weights with text embeddings of the target vocabulary to learn vision-to-language mapping.

It is an object to perform weakly-supervised object detection using high-quality object proposals from a pretrained multi-modal vision transformer in order to enlarge detector vocabulary and generalize towards novel object categories. It is a further object to use fixed manual prompts and focus on improving the object-centric representations for open-vocabulary object detection.

SUMMARY

An aspect of the present disclosure is an object detection system, that can include at least one camera configured to capture at least one image: processing circuitry of a machine learning engine configured with an object vocabulary training component having a region-based knowledge distillation stage and an image-level supervision stage joined by a weight transfer function, and an object detection inference component determined with the object vocabulary training component: the region-based knowledge distillation stage configured to generate region embeddings from a training image having at least one bounding box for an object as input, wherein the region-based knowledge distillation stage includes: a linear layer configured to learn a region-level vision-language mapping for projecting feature embeddings from the training image to a common feature space shared by text embeddings to obtain the region embeddings, and a loss function configured to optimize alignment between the region embeddings and the text embeddings: the image-level supervision stage configured to generate pseudo-box labels for the classification training image and region embeddings with the training image having bounding boxes and corresponding class labels and a classification training image having an image-level label as input, wherein the image-level supervision stage includes: a computing component configured to determine a plurality of pseudo-box labels on the classification training image as an image-level vision-language mapping, and to compute region embeddings for the plurality of pseudo-box labels: the weight transfer function conditions the image-level vision-language mapping on the learned region-level vision-language mapping: and the object detection inference component configured to output the captured image annotated with a bounding box for a novel object that was not included in the training image having bounding boxes by performing object detection on the captured image.

A further aspect of the present disclosure is a non-transitory computer readable storage medium storing program instructions, which when executed by processing circuitry of a machine learning engine including an object vocabulary training component having a region-based knowledge distillation stage and an image-level supervision stage, which are joined by a weight transfer function, and an object detection inference component determined with the object vocabulary training component, the processing circuitry performs a method that can include generating region embeddings, by the region-based knowledge distillation stage, from a training image having at least one bounding box for an object as input, including learning a region-level vision-language mapping for projecting feature embeddings from the training image to a common feature space shared by text embeddings to obtain the region embeddings, and optimizing, by a loss function, alignment between the region embeddings and the text embeddings: generating pseudo-box labels for a classification training image and the region embeddings, by the image-level supervision stage, from the training image having bounding boxes and corresponding class labels and the classification training image having an image-level label as input, including determining a plurality of pseudo-box labels on the classification training image as an image-level vision-language mapping, and computing region embeddings for the plurality of pseudo-box labels; conditioning the image-level vision-language mapping on the learned region-level vision-language mapping by the weight transfer function; and outputting the captured image annotated with a bounding box for a novel object that was not included in the training image having bounding boxes by performing object detection on the captured image.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
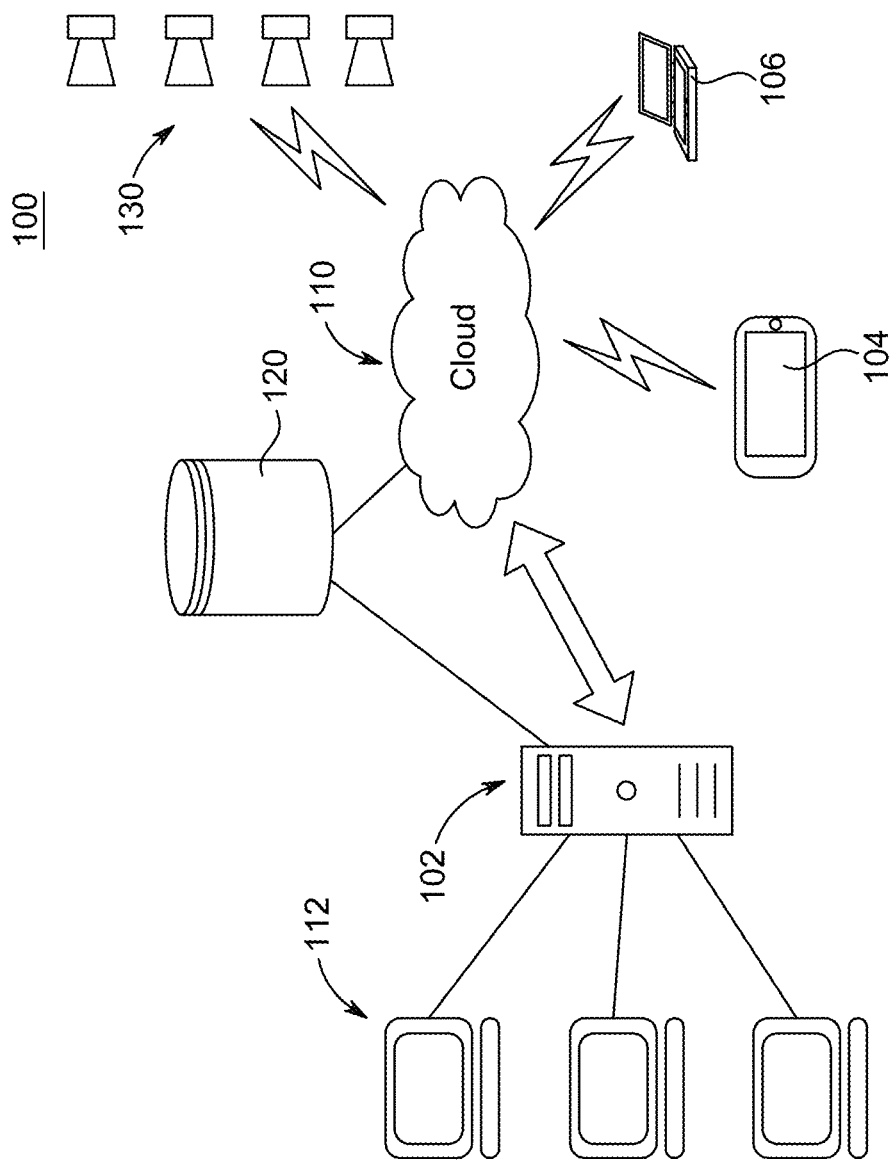
FIG. 1 is a diagram of a machine learning system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

One of the major challenges with enlarging vocabulary via image-level supervision (ILS) or pretrained models learned using ILS is the inherent mis-match between region and image-level cues. The present object detector seeks to bridge the gap between object and image-centric representations within the OVD pipeline. To this end, the present object detector utilizes high-quality class-agnostic proposals and class-specific object proposals via the pretrained multi-modal vision transformer (ViT). See Muhammad Maaz, Hanoona Rasheed, Salman Khan, Fahad Shahbaz Khan, Rao Muhammad Anwer, and Ming-Hsuan Yang. Multi-modal transformers excel at class-agnostic object detection. *arXiv preprint arXiv:* 2111.11430, 2021, incorporated herein by reference in its entirety. The original CLIP model uses image-centric embeddings. A solution provided by the present object detector is to use class-agnostic object proposals to distill region-specific information in CLIP visual embeddings, making them suitable for local objects. A further enhancement is a class-specific proposal set that allows to visually ground a larger vocabulary, thereby aiding in generalization to novel categories. Still there remains a final and important question as to how to make a visual-language (VL) mapping amenable to local object-centric information. For this purpose, a solution is a region-conditioned weight transfer process that closely ties together image and region VL mapping. In a nutshell, the present approach connects the image, region and language representations to generalize better to novel open-vocabulary objects.

The present object detector uses region-based knowledge distillation to adapt image-centric CLIP embeddings for local regions, thereby improving alignment between region and language embeddings. The resulting well-aligned representations aid in improving the overall performance of a text driven OVD pipeline.

In order to visually ground weak image labels, the present object detector performs pseudo-labeling using the high-quality object proposals from pretrained multi-modal ViTs. This helps in enlarging the class vocabulary and therefore generalizes better to new object classes.

The alignment between region and language embeddings and pseudo labeling mainly target the visual domain. In order to preserve the benefits of object-centric alignment in the language domain, the (pseudo-labeled) image-level VL mapping is explicitly conditioned on the region-level VL mapping via a weight transfer function. In this manner, the present object detector simultaneously integrates object-centric visual and language alignment within a single architecture for OVD.

Extensive experiments demonstrate the improved OVD capability of the present approach. On COCO and LVIS benchmarks, the present training method achieves absolute gains of 8.2 and 5.0 AP on novel and rare classes over the current SOTA methods. Average precision (AP) computes the average precision value for recall value over 0 to 1 and is a popular metric in measuring the accuracy of object detectors. Further generalizability is demonstrated by cross-dataset evaluations performed on COCO, OpenImages and Objects365, leading to consistent improvements compared to conventional methods.

FIG. 1 is a diagram of a machine learning system in accordance with an exemplary aspect of the disclosure. Object detectors can be trained in a special purpose workstation 102 or cloud service 110, or a combination of both depending on the sale of the machine learning model. Images for machine learning may be obtained from multiple camera systems 130. The camera systems 130 can be mounted on a single platform, or may be spread out over several different platforms. Images captured by the cameras 130 may be stored in a database system 120. The database system 120 is not limited to a single database, but may involve separate databases, distributed databases, or may be a cloud-based database system. In an exemplary embodiment, a special purpose workstation or artificial intelligence (AI) workstation 102 may be configured for training an object detector. With such a configuration, one or more client computers 112 may be used to perform testing of several object detectors at a time. In the embodiment, the workstation 102 may be connected to a cloud service 110. The cloud service 110 may be accessible via the Internet. The cloud service 110 may provide a database system and may provide object services for various mobile devices 104, 106. Viewers of the images showing detected objects may be served by the cloud service.

Figure 2:
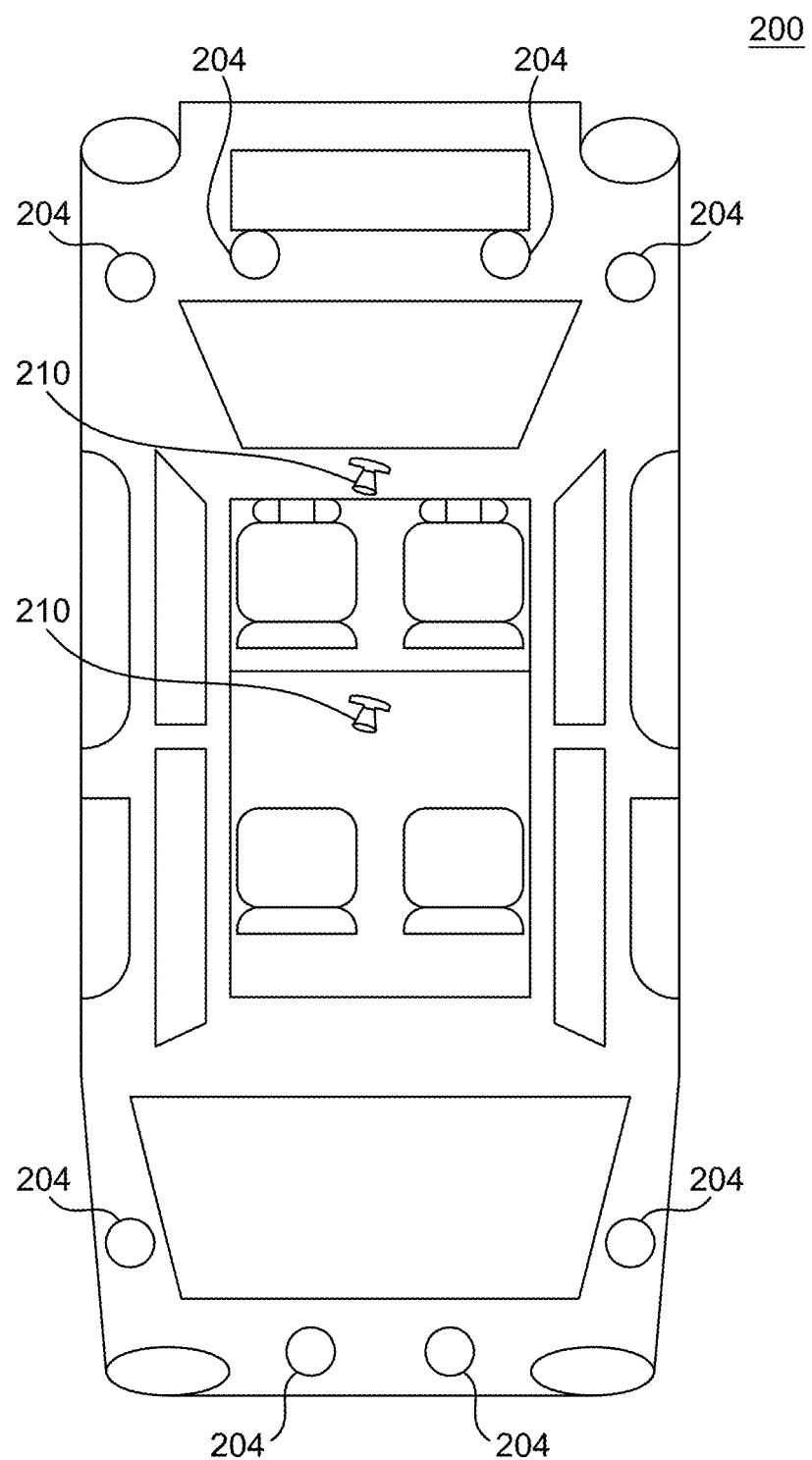
FIG. 2 is top view of a vehicle having multiple cameras.

FIG. 2 is top view of a vehicle having multiple cameras. A non-limiting vehicle having advanced driver assist technologies can have multiple video cameras 204, positioned along the exterior body and/or the vehicle roof in order to capture images around the surrounding environment. A vehicle may also have cameras 210 located in the interior cabin.

Adaptive features for ADAS may assist in avoiding collisions, incorporate traffic warnings, alert drivers to possible obstacles, and assist in lane departure and lane centering, which utilize images captured by external cameras 204.

With growing interest in deep neural networks, the Regions with Convolutional Neural Network (R-CNN) deep neural network model led to a breakthrough for multiple object detection, with a 95.84% improvement in Mean Average Precision (mAP) over the state-of-the-art. This development helped redefine the efficiency of object detectors and made them attractive for entirely new application domains, such as for AVs. The evolution in deep neural networks and advances in GPU technology have paved the way for faster and more efficient object detection on real-time images and videos.

Object detection has been divided into two sub-tasks: localization, which involves determining the location of an object in an image (or video frame), and classification, which involves assigning a class (e.g., 'pedestrian', 'vehicle', 'traffic light') to that object.

In the open-vocabulary detection problem, an object detection dataset is where the training set, $\mathcal{D}_{det}$, comprises of samples from the set of base object categories, $\mathcal{C}_B$. The images of $\mathcal{D}_{det}$ are exhaustively annotated with bounding-box labels and corresponding class labels $y_r \in \mathcal{C}_B$, for the different objects in the image. Given an image $I \in \mathbb{R}^{H \times W \times 3}$, an open-vocabulary object detector solves two subsequent problems: (1) effectively localize all objects in the image, (2) classify the detected region into one of the class label of $\mathcal{C}_{test}$, which is provided by the user at test time. The categories during test time also include novel categories $\mathcal{C}_N$ beyond the closed set of base categories seen during the training phase, i.e., $\mathcal{C}_{test} = \mathcal{C}_B \cup \mathcal{C}_N$.

Two-stage deep learning based object detectors involve a two-stage process consisting of 1) region proposals and 2) object classification. In the region proposal stage, the object detector proposes several Regions of Interest (ROIs) in an input image that have a high likelihood of containing objects of interest. In the second stage, the most promising ROIs are selected (with other ROIs being discarded) and objects within them are classified. Conventional two-stage detectors include R-CNN, Fast R-CNN, and Faster R-CNN.

The Regions with Convolutional Neural Network (R-CNN) deep neural network model was one of the first deep learning-based object detectors and used an efficient selective search algorithm for ROI proposals as part of a two-stage detection. Fast RCNN solved some of the problems in the R-CNN model, such as low inference speed and accuracy. In the Fast R-CNN model, the input image is fed to a Convolutional Neural Network (CNN), generating a feature map and ROI projection. These ROIs are then mapped to the feature map for prediction using ROI pooling. Unlike R-CNN, instead of feeding the ROI as input to the CNN layers, Fast R-CNN uses the entire image directly to process the feature maps to detect objects. Faster R-CNN used a similar approach to Fast R-CNN, but instead of using a selective search algorithm for the ROI proposal, it employed a separate network that fed the ROI to the ROI pooling layer and the feature map, which were then reshaped and used for prediction.

Figure 3:
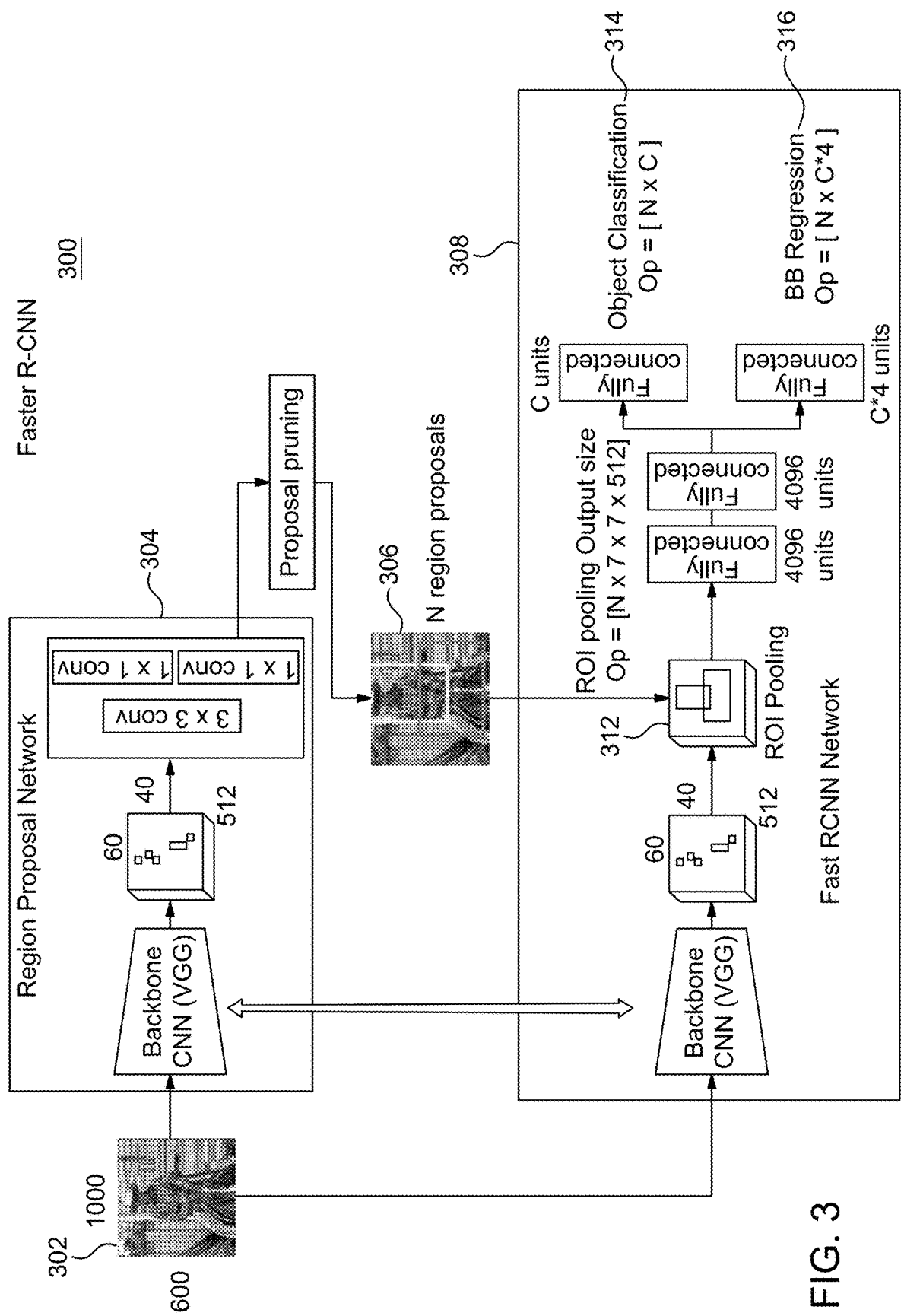
FIG. 3 is a high-level diagram of an architecture for the Faster R-CNN neural network.

FIG. 3 is a high-level diagram of an architecture for the Faster R-CNN neural network.

Faster R-CNN uses a convolutional network, referred to as a region proposal network (RPN) 304, in combination with a Fast R-CNN 308. The region proposal network (RPN) 304 starts with the input image 302 being fed into the backbone convolutional neural network. The input image 302 is first resized such that its shortest side is 600 px with the longer side not exceeding 1000 px. As the network moves through each pixel in the output feature map, it has to check whether these k corresponding anchors spanning the input image actually contain objects, and refine these anchors' coordinates to give bounding boxes as "Object proposals" or regions of interest 306.

The Fast R-CNN detector 308 also consists of a CNN backbone, an ROI pooling layer 312 and fully connected layers followed by two sibling branches for classification 314 and bounding box regression 316. The ROI pooling layer 312 works by a) Taking the region corresponding to a proposal from the backbone feature map: b) Dividing this region into a fixed number of sub-windows: c) Performing max-pooling over these sub-windows to give a fixed size output. After passing them through two fully connected layers, the features are fed into the sibling classification 314 and regression 316 branches. The classification 314 is trainable with a classification loss $L_c$ $\square\square(p_i, p_i^*)$ that is the log loss over two classes (object vs not object). The regression loss $L_{re}(t_i, t_i^*)$ is activated only if the anchor actually contains an object.

At test time, all the boxes are arranged according to their cls scores. Then, a non-maximum suppression (NMS) is applied with a threshold of 0.7. From the top down, all of the bounding boxes which have an IoU of greater than 0.7 with another bounding box are discarded. Thus, the highest-scoring bounding box is retained for a group of overlapping boxes. The cross-boundary bounding boxes are retained and clipped to image boundary.

Object-Centric Open-Vocabulary Detection

Figure 4:
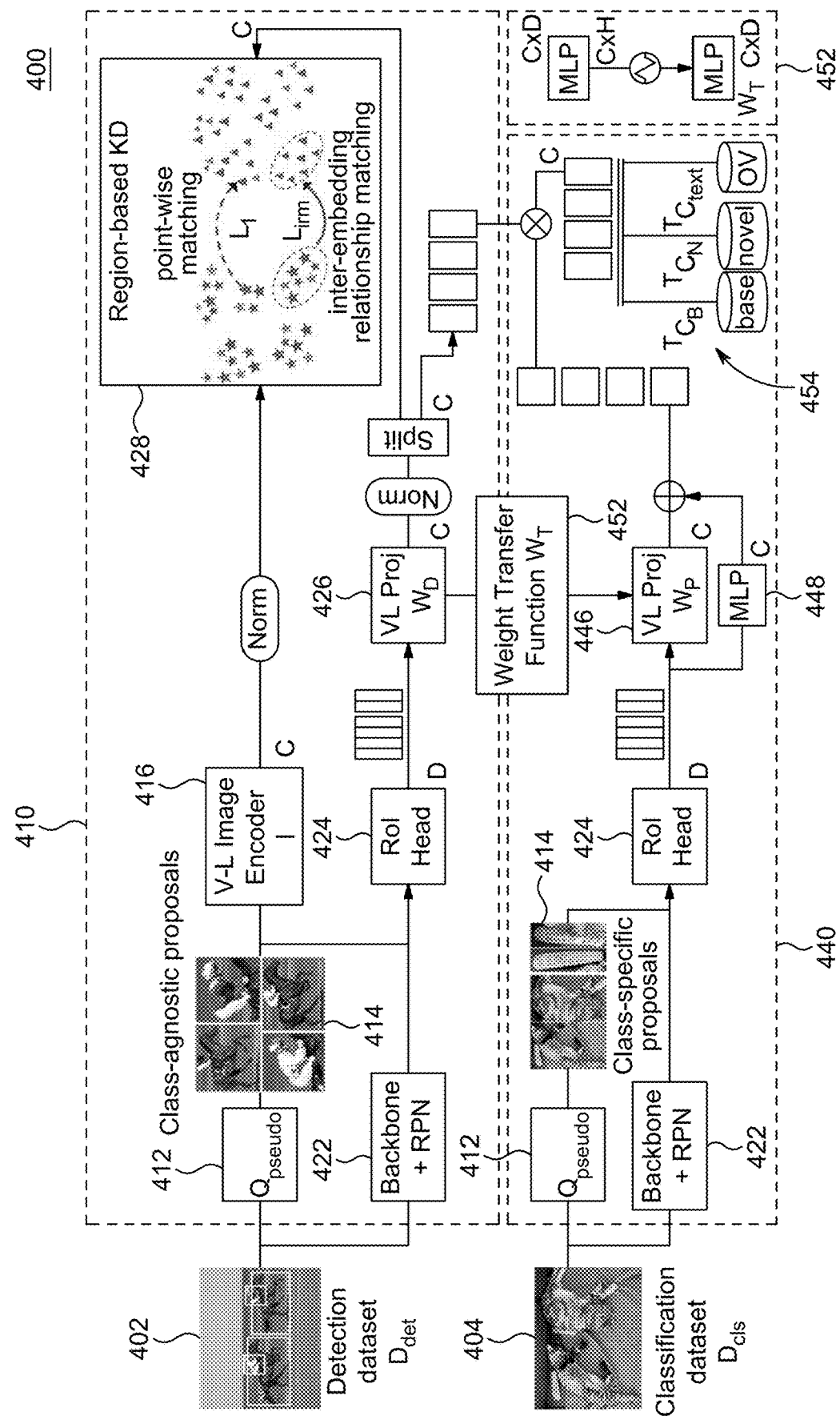
FIG. 4 is a diagram of an object-centric framework for open-vocabulary detection, in accordance with an exemplary aspect of the disclosure.

FIG. 4 is a diagram of an object-centric framework for open-vocabulary detection, in accordance with an exemplary aspect of the disclosure. The present object detector has an architecture in which a two-stage object detector, such as the Faster R-CNN of FIG. 3, has the learnable classifier head replaced with fixed language embeddings.

As discussed earlier, conventional OVD methods that use different forms of weak supervision employ image-centric representations, making them less suited for the end object detection task. The present OVD method aims to bridge the gap between image and object-centric visual-language (VL) representations. The present framework 400 has three main elements. 1) A region-based knowledge distillation 410 adapts image-centric language representations to be object-centric. A VL mapping 426 learns to align the local region representations of the detector 440 to the language representations by distilling the detector's region representations with region representations from a VL model (CLIP). 2) Given weak image-level supervision, s pseudo-labeling from pretrained multi-modal ViTs improve generalization of the detector 440 to novel classes. 3) For efficient combination of the above two proposed components, the VL mapping learned during the weak supervision is conditioned on the VL mapping 426 learned with region-based distillation via a novel weight transfer function 452. Specifically, a stage-wise learning strategy is to first align the region and language embeddings using RKD, and then use the distilled VL mapping for object-centric visual and language alignment in the subsequent stage 440.

Detection Pipeline: Preliminaries

The overall detection pipeline for the present OVD has fixed language embeddings, $\mathcal{T}$ corresponding to the category names of $\mathcal{C}_{test}$, that are obtained using a large-scale pretrained VL model. Similar to a technique in Gu et al., the text embeddings are obtained from a CLIP text encoder for classification, where only the embeddings of $\mathcal{C}_B$ categories, $\mathcal{T}_{C_B}$ 454 are used during training. In one embodiment, the text embeddings are generated offline, by processing the prompts corresponding to each category with a template of 'a photo of {category}' through the CLIP text encoder. The RoI head 424 computes pooled feature representations $\phi(r)$ of the proposals r generated by the region proposal network (RPN) 422. These feature embeddings are projected to a common feature space shared by the text embedding $\mathcal{T}$ using a linear layer $f(\bullet)$, which is represented as region embeddings, $\mathcal{R} = f(\phi(r)) \in \mathbb{R}^D$. For classification, the cosine similarity between the region embeddings and text embeddings is computed to find the matching pairs. During training, the regions that do not match with any of the ground-truths are assigned to the background category represented by a fixed all zero embedding. The cosine similarity is computed by comparing each region to each base class, $\mathcal{V} = \text{sim}(r,b) = \cos(\mathcal{R}(r), \mathcal{T}_b) \forall b \in \mathcal{C}_B$. The classification loss is a softmax cross-entropy (CE) where the logits are the cosine similarity scores, $$\mathcal{L}_{cls} = \frac{1}{N}\sum_r \mathcal{L}_{CE}\left(\text{softmax}\left(\frac{\mathcal{V}}{\mathcal{T}}\right), \mathcal{Y}_r\right), \mathcal{Y}_r \in \mathcal{C}_B.$$

where $\tau$ is the temperature, N is the total number of proposals per image, and r represents a single proposal with the ground-truth label $\mathcal{Y}_r$.

Region-Based Knowledge Distillation

The present object detector uses region-based knowledge distillation to adapt image-centric CLIP embeddings for local regions, thereby improving alignment between region and language embeddings. In the present OVD framework, it is assumed that $f(\bullet)$ learns a VL mapping and aligns the output region embeddings of the detector with the corresponding CLIP text embeddings. However, it has been determined that the performance on novel categories is not comparable to what CLIP encoded embeddings would provide. It is hypothesized that this performance gap is mainly due to two reasons, i) the data that has been used for training the CLIP model consists of scene-centric images, making it less suitable for region classification, e.g., in a case where object-centric tightly bounded proposals are used, ii) the zero-shot generalization ability of the pair-wise trained CLIP image and text embeddings cannot be fully utilized due to the mismatch between regions representations from CLIP image encoder and the present object detector.

In particular, a comparison has been performed between the zero-shot classification performance of an open-vocabulary detector and a pretrained CLIP model on COCO validation dataset. Table 1 shows the results where the top-1 classification accuracy is evaluated using the ground-truth object bounding boxes from COCO. The CLIP pretrained model shows better results for novel classes as compared to supervised-base model, indicating the strong generalization of the CLIP (row-1 vs 2). However the base class accuracy is higher for the supervised-base model as it is trained using COCO base classes. Further, using the present region-based knowledge distillation (RKD) and the present weight transfer function improves the base and novel class performance, indicating an object-centric alignment in latent space.

TABLE 1

Classification results on novel and base classes with boxes cropped from COCO validation dataset using ground truth annotations.

| Method | Top-1$_{base}$ | Top-1$_{novel}$ | Top-1$_{overall}$ |
| --- | --- | --- | --- |
| 1: Supervised (Base) | 88.8 | 42.5 | 76.7 |
| 2: CLIP | 57.3 | 59.4 | 57.8 |

TABLE 1-continued

Classification results on novel and base classes with boxes cropped
from COCO validation dataset using ground truth annotations.

| Method | Top-1$_{base}$ | Top-1$_{novel}$ | Top-1$_{overall}$ |
|---|---|---|---|
| 3: RKD | 86.0 | 60.2 | 79.2 |
| 4: Weight transfer | 90.3 | 82.2 | 88.2 |

Based on these insights, a region-based knowledge distillation (RKD) has been developed.

The present RKD uses distillation in the detection pipeline by distilling region embeddings from high-quality class-agnostic proposals ($\tilde{r}$) obtained from a pretrained multi-modal ViT (MViT). Note that both class-agnostic (used in RKD) and class-specific object proposals are obtained using this pseudo-labeling process, which is referred to as $Q_{pseudo}$ 412. This is possible by using intuitive text queries to interact with the MViT model that can locate generic objects and provides the corresponding set of candidate proposals. The queries can be generic or targeted, based on the task, e.g., 'all objects' to generate class-agnostic proposals, or 'every dog' for a specific class.

Figure 8B:
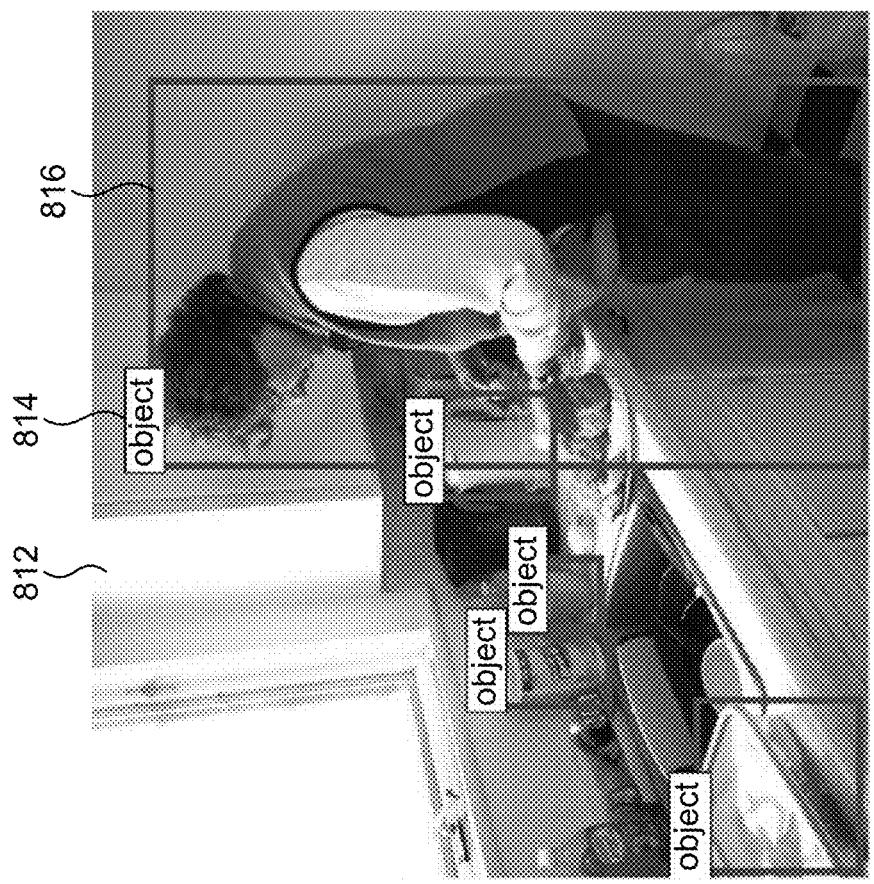
FIGS. 8A, 8B illustrate class-agnostic proposals for region proposal network compared to proposals by the MViT.
Figure 8A:
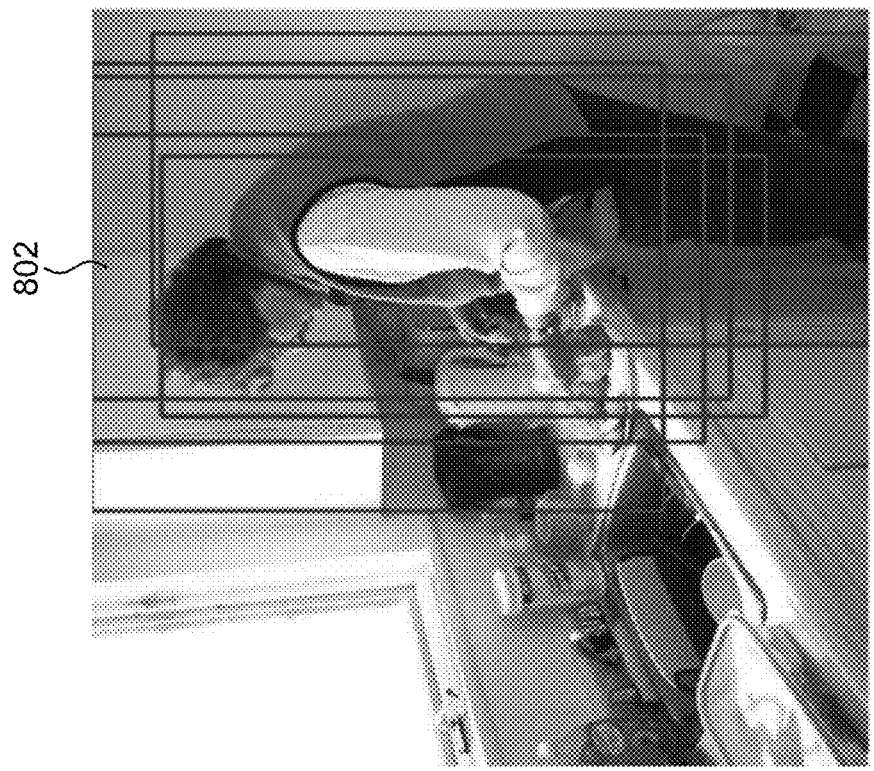

For the present RKD, class agnostic proposals are computed on $\mathcal{D}_{det}$ 402 using a simple text query, 'all objects' and top-K proposals 414 are selected (FIGS. 8A, 8B).

Class-agnostic Proposals 414: In the present region-based knowledge distillation 410 (RKD), an improved region-level alignment is obtained with fewer high-quality proposals from a generalized class-agnostic proposal generator. Top-K RPN proposals (FIG. 8A) are compared with top-K multi-modal ViTs proposals used in a class-agnostic manner (FIG. 8B).

In one embodiment, CLIP embeddings $\mathcal{J}(\tilde{r})$ are then computed offline using the CLIP image encoder $\mathcal{J}(\bullet)$ 416.

Figure 5:
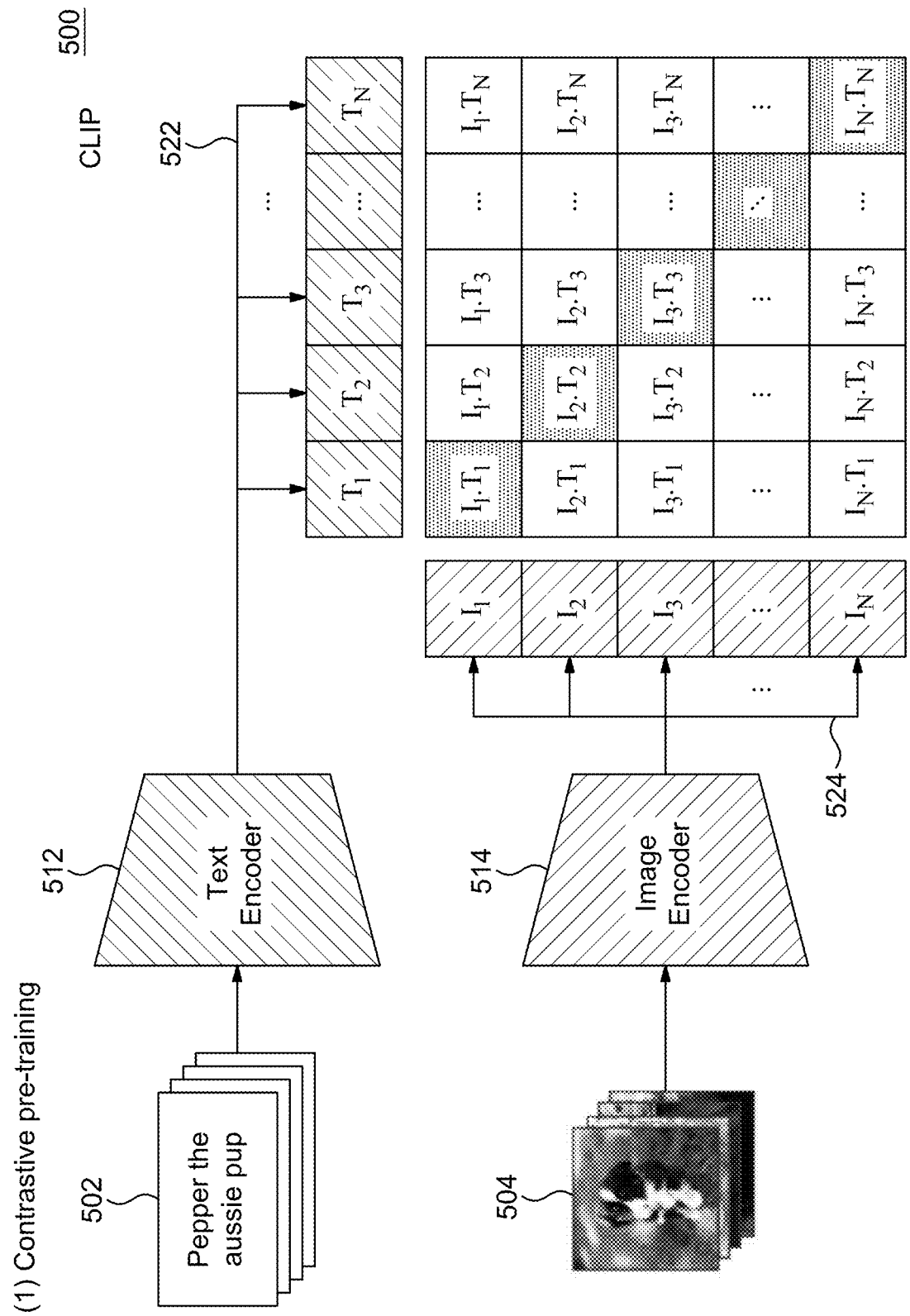
FIG. 5 is a diagram of a framework for Contrastive Language-Image Pre-training (CLIP) network.

FIG. 5 is a diagram of a framework for Contrastive Language-Image Pre-training (CLIP) network.

A conventional CLIP jointly trains an image encoder 524 and a text encoder 514 to predict the correct pairings 522, 512 of a batch of (image 504, text 502) training examples. With the detector region embeddings and the corresponding CLIP region representations, two types of distillation losses 428 are used to improve the alignment.

(1) Point-wise embedding matching loss: The $\mathcal{L}_1$ loss matches the individual region embeddings $\tilde{\mathcal{R}}=f(\phi(\tilde{r}))$ with the CLIP region representations $\mathcal{J}(\tilde{r})$, $$\mathcal{L}_1 = \frac{1}{K}\sum_{\tilde{r}} \|\tilde{\mathcal{R}} - \mathcal{J}(\tilde{r})\|_1. \quad (1)$$

Using this criteria, the visual encoder 416, along with the VL projection layer $f(\bullet)$ 426, approximates the CLIP image encoder and subsequently aligns the region embeddings with the CLIP text embeddings.

(2) Inter-embedding relationship matching loss (IRM):

IRM is a knowledge distillation based loss $\mathcal{L}_{irm}$ that instills inter-embedding relationships within region representations to be consistent to the CLIP region representations. See Frederick Tung and Greg Mori. Similarity-preserving knowledge distillation. In *Proceedings of the IEEE CVF International Conference on Computer Vision*, 2019, incorporated herein by reference in its entirety. Instilling such inter-embedding relations would be beneficial as the teacher model $\mathcal{J}(\bullet)$, and the student model (the present detector), are different in nature with respect to their training methods.

Figure 6:
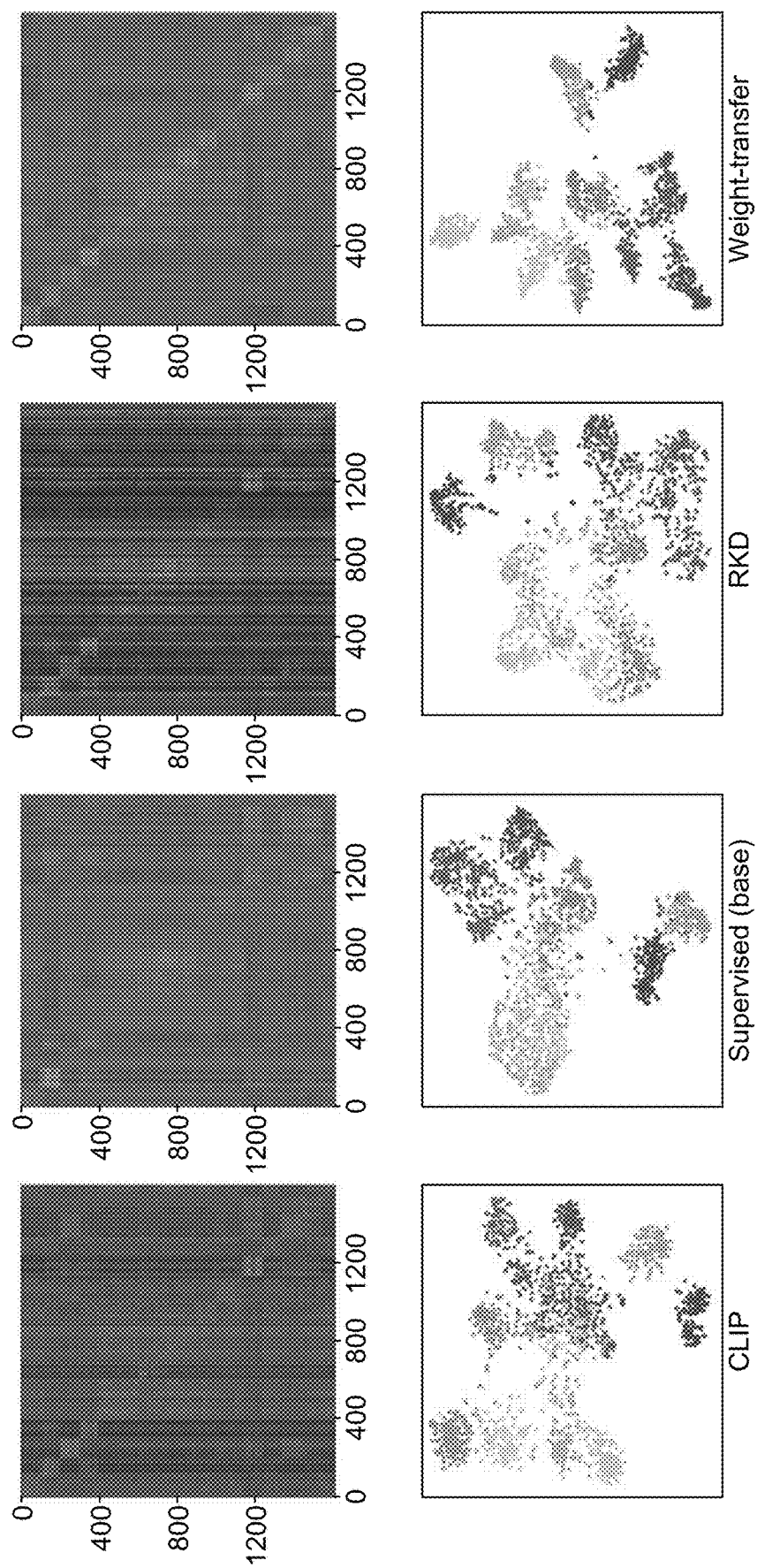
FIG. 6 top: illustrates similarity matrices computed on the CLIP and detector region embeddings for COCO classes, FIG. 6 bottom: are t-SNE plots of CLIP and detector region embeddings on novel COCO categories.

FIG. 6 illustrates, in the top-row, similarity matrices computed on the CLIP ($S_J$) and detector ($S_R$) region embeddings for COCO novel classes. A subset of 100 randomly selected samples per category form a batch represented by a column are grouped together. The present region-based distillation enforces the similarity patterns in the RKD model to be closer to the teacher model, CLIP, indicated by the bright patterns along diagonals. The bottom-row illustrates t-SNE plots of CLIP and detector region embeddings on novel COCO categories. The CLIP aligned RKD and weight transferred detector embeddings shows improved separability among novel class features as compared to the supervised detector region embeddings.

t-distributed stochastic neighbor embedding (t-SNE) is a statistical method for visualizing high-dimensional data by giving each datapoint a location in a two-dimensional map.

The IRM loss is defined on pairwise similarity matrices of the two different set of embeddings. Specifically, with the top-K proposals computed from $Q_{pseudo}$, K×K similarity matrices are composed for $\mathcal{J}(\tilde{r})$ and $\tilde{\mathcal{R}}$ denoted by $S_J$ and $S_R$ respectively. Notably, these matrices are normalized by L2 norm applied row-wise. The IRM loss is a Frobenius norm$\|\bullet\|_F$, over the mean element-wise squared difference between $S_J$ and $S_{\mathcal{R}}$, $$S_R = \frac{\tilde{R}\cdot\tilde{R}^T}{\|\tilde{R}\cdot\tilde{R}^T\|_2}, S_J = \frac{\mathcal{J}(\tilde{r})\cdot\mathcal{J}(\tilde{r})^T}{\|\mathcal{J}(\tilde{r})\cdot\mathcal{J}(\tilde{r})^T\|_2}, \quad (2)$$

$$\mathcal{L}_{irm} = \frac{1}{K^2}\|S_R - S_J\|_F^2.$$

The $\mathcal{L}_1$ and $\mathcal{L}_{irm}$ losses are weighted by factors $\beta_1$ and $\beta_2$, respectively. Together with the two-stage detector losses: RPN loss ($\mathcal{L}_{rpn}$), regression loss ($\mathcal{L}_{reg}$) and classification loss ($\mathcal{L}_{cls}$); the overall training objective with RKD can be expressed as, $$\mathcal{L}_{irm} = \frac{1}{K^2}\|S_R - S_J\|_F^2. \quad (3)$$

See Ren et al.; and Kaiming He, Georgia Gkioxari, Piotr Dollár, and Ross Girshick. Mask R-CNN. In *Proceedings of the IEEE CVF Conference on Computer Vision and Pattern Recognition*, 2017, each incorporated herein by reference in their entirety.

Image-Level Supervision with Pseudo Box Labels

Figure 9B:
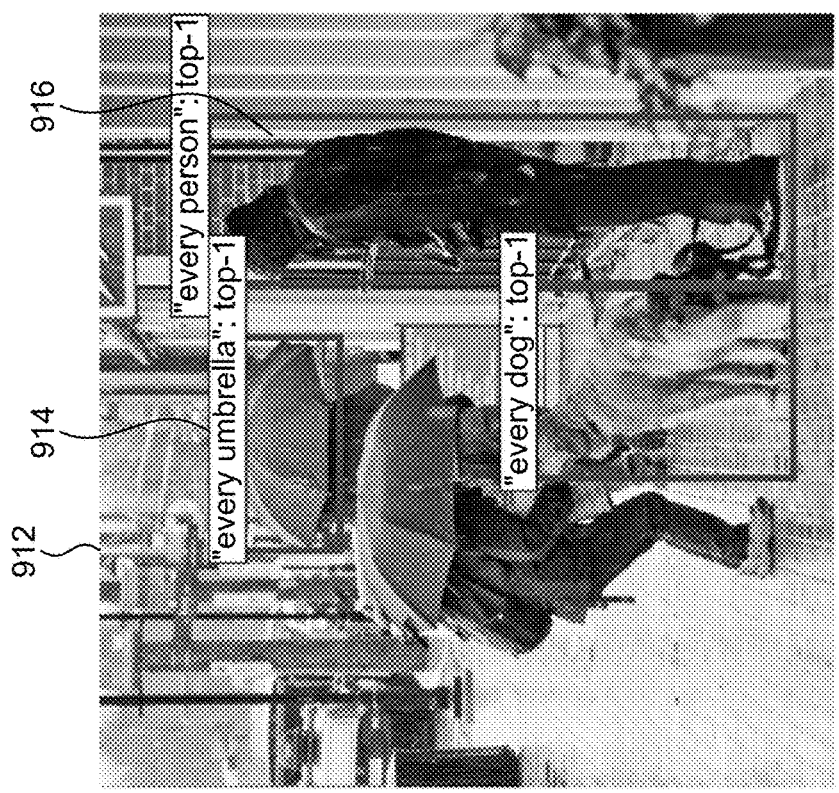
FIGS. 9A, 9B illustrate class-specific proposals based on heuristic methods compared to the present region-based knowledge distillation.
Figure 9A:
Figure 10A:
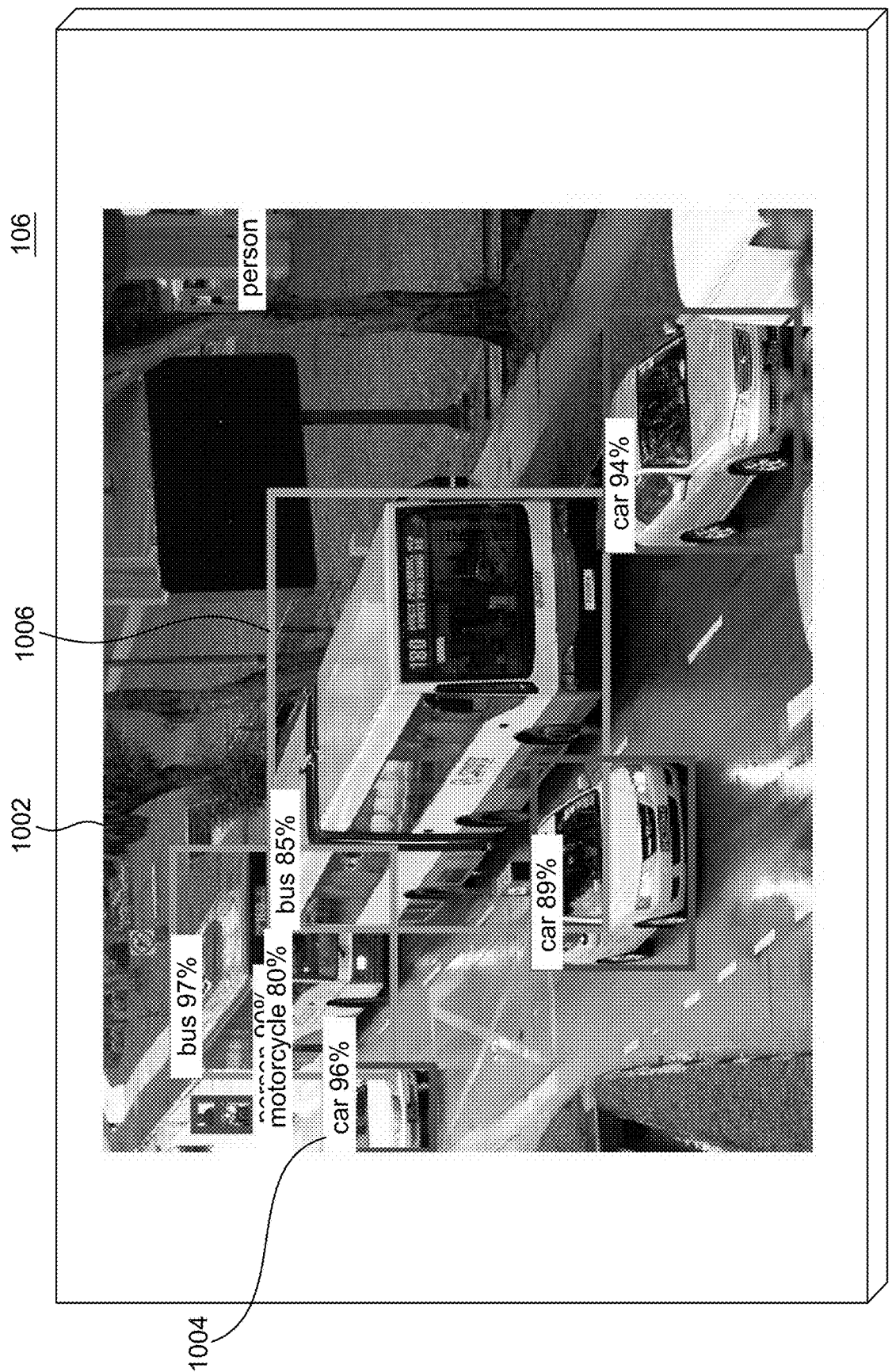
FIGS. 10A-10D illustrate category detection using COCO dataset.
Figure 10B:
Figure 10C:
Figure 10D:
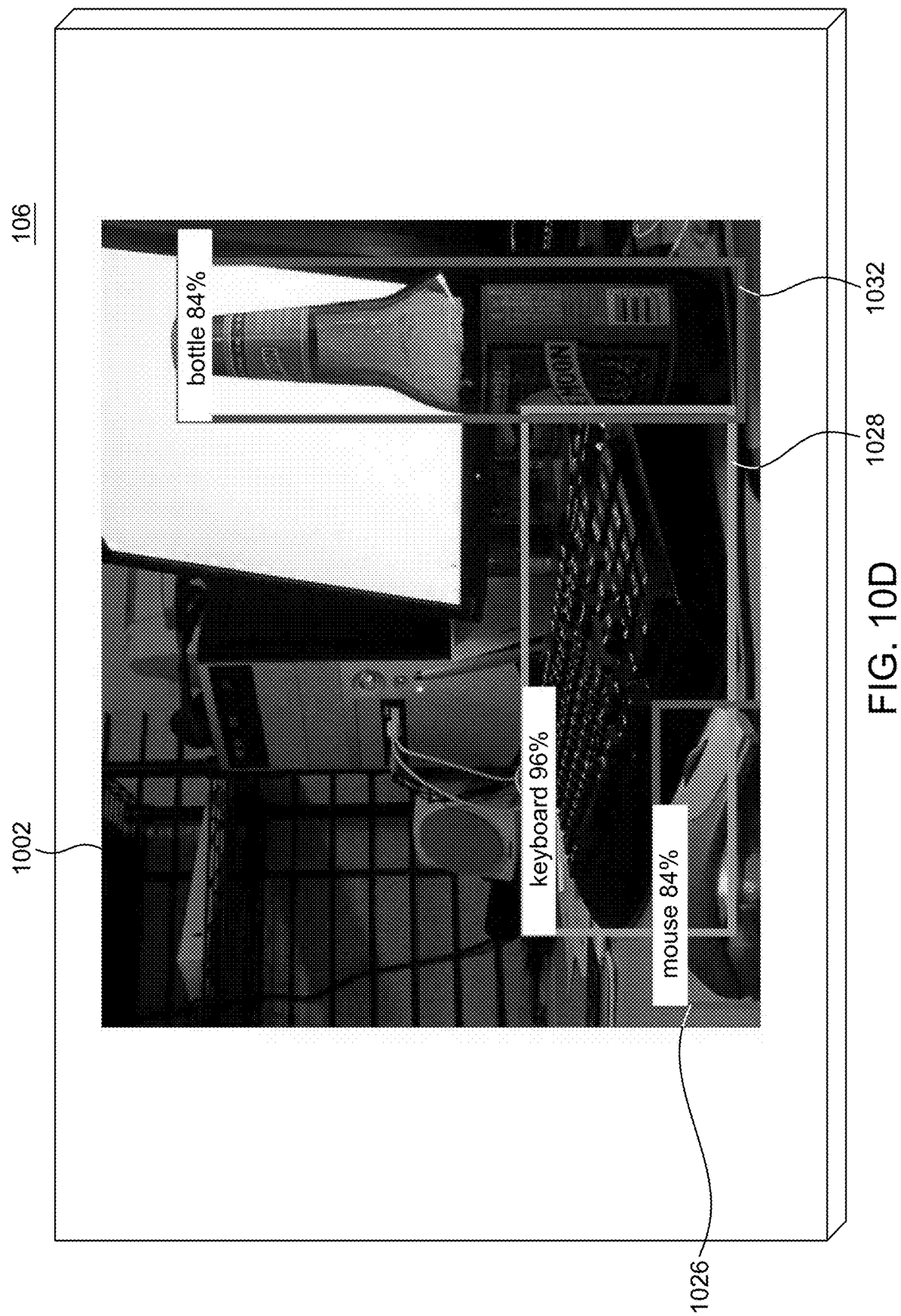
Figure 10E:
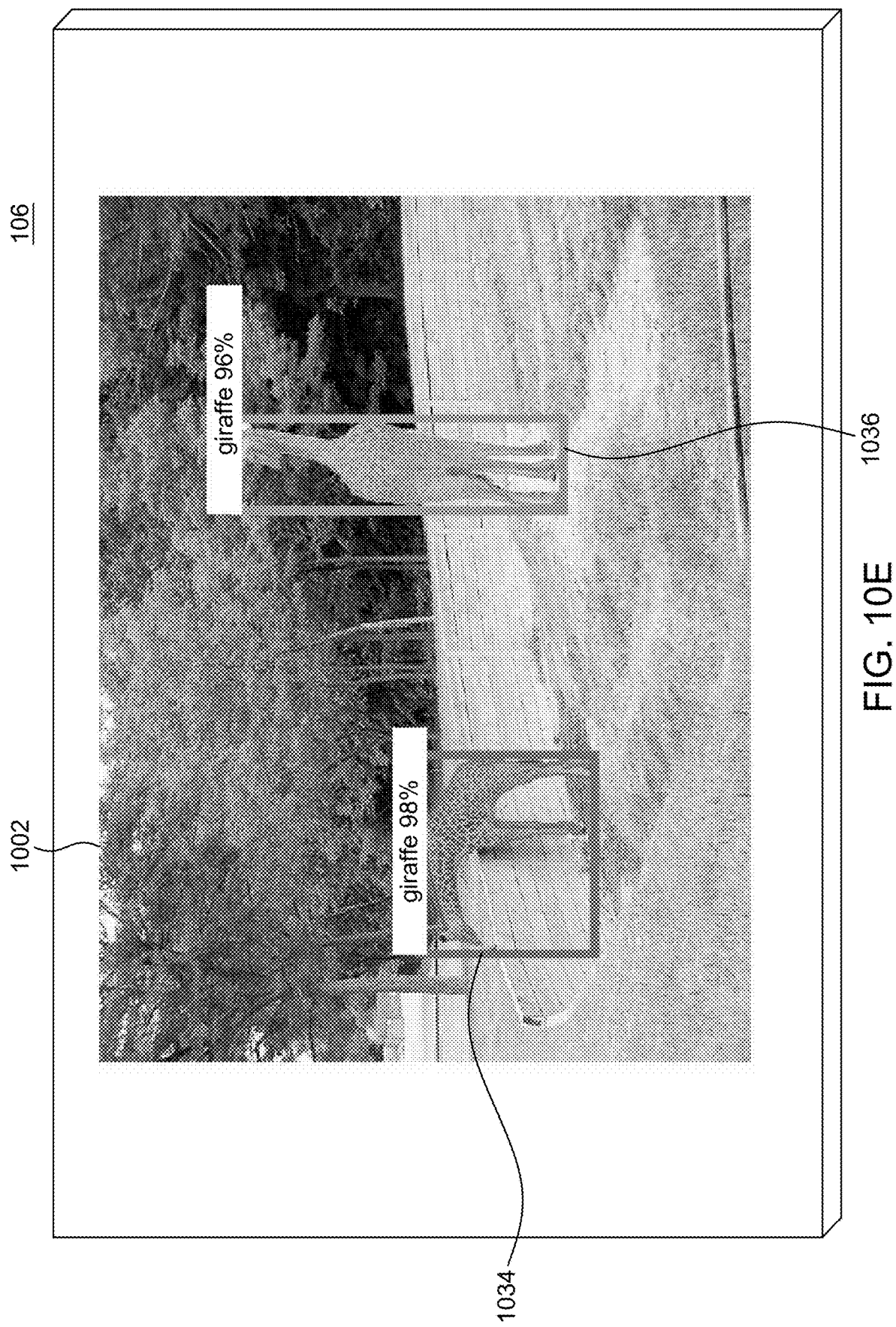
FIGS. 10E-10H illustrate category detection using LVIS dataset, in accordance with an exemplary aspect of the disclosure.
Figure 10F:
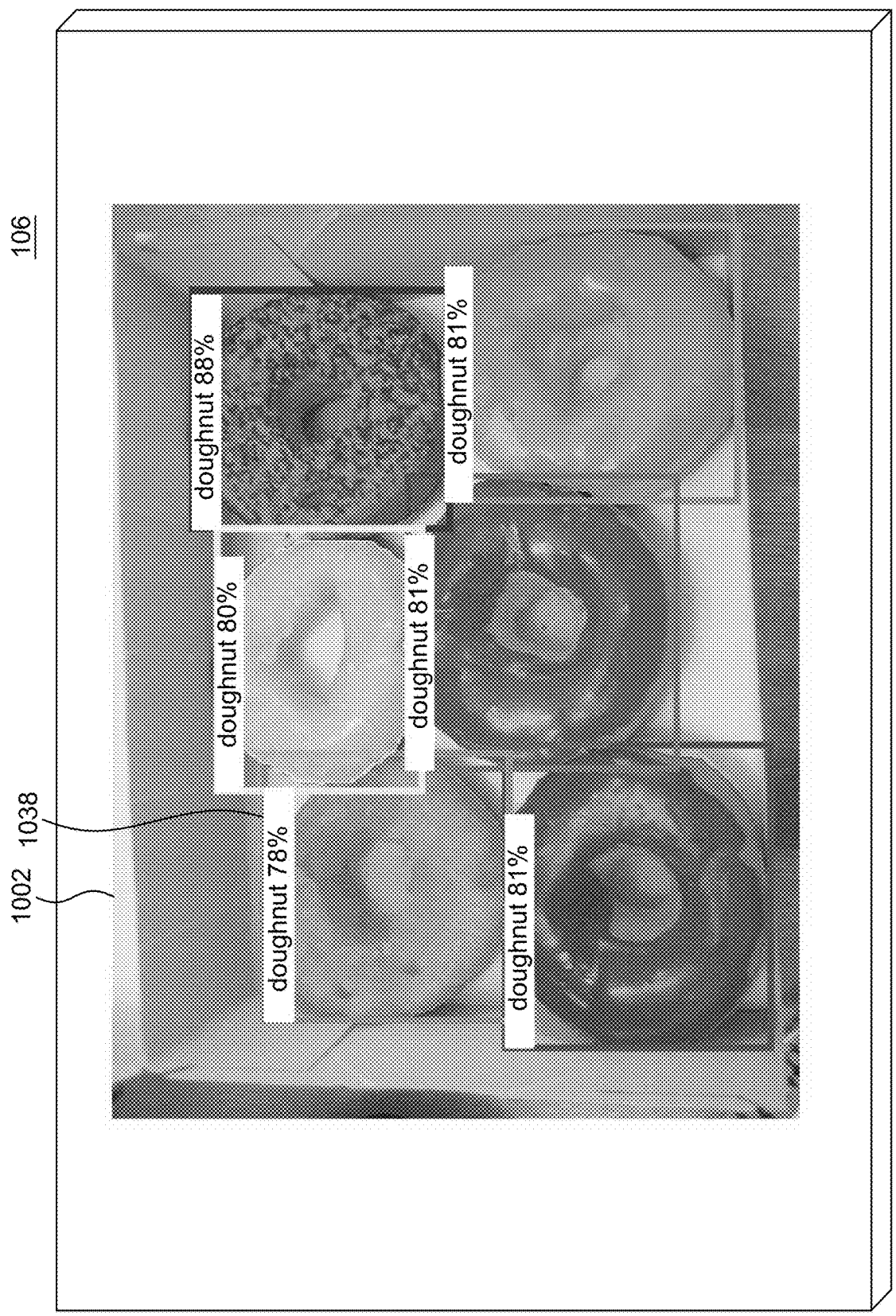
Figure 10G:
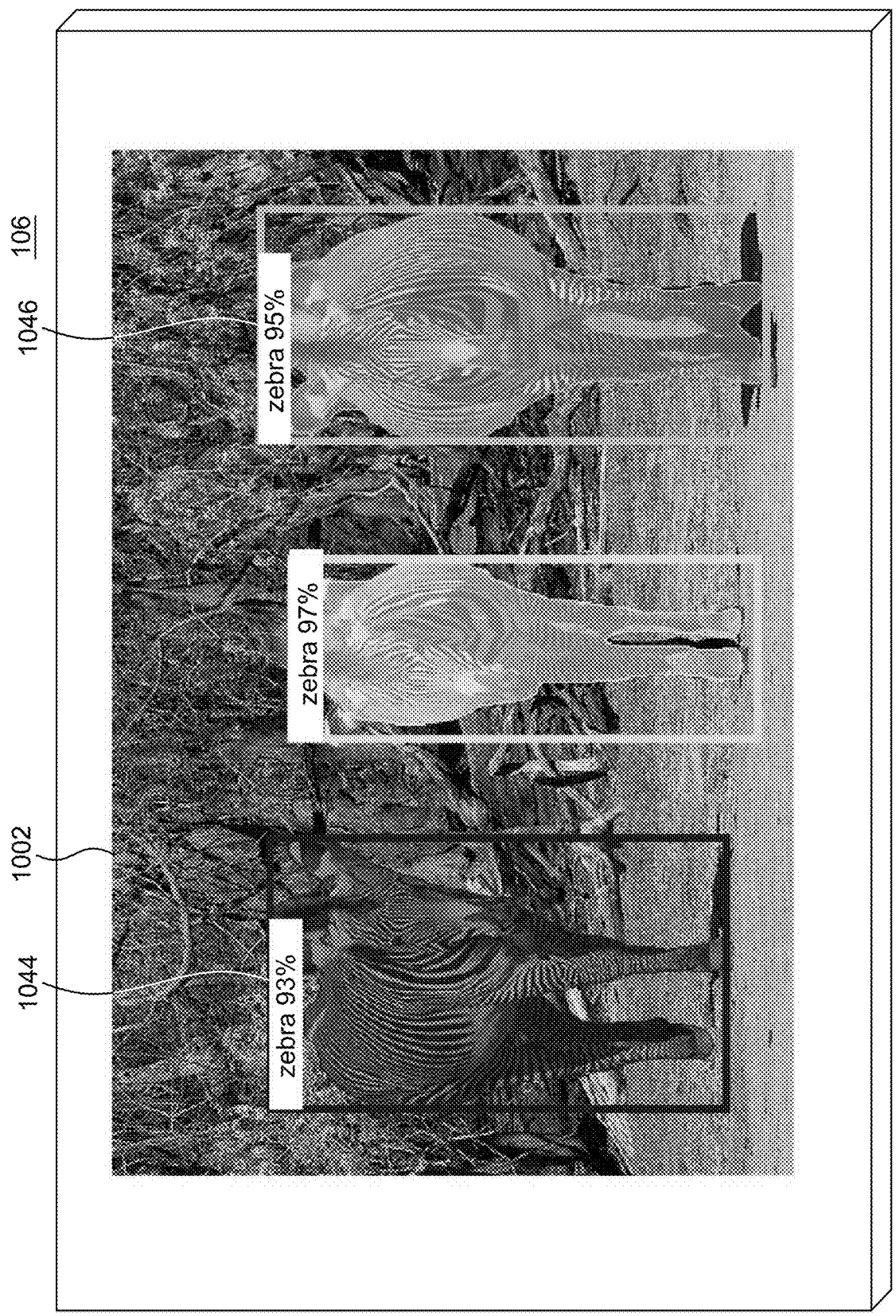
Figure 10H:
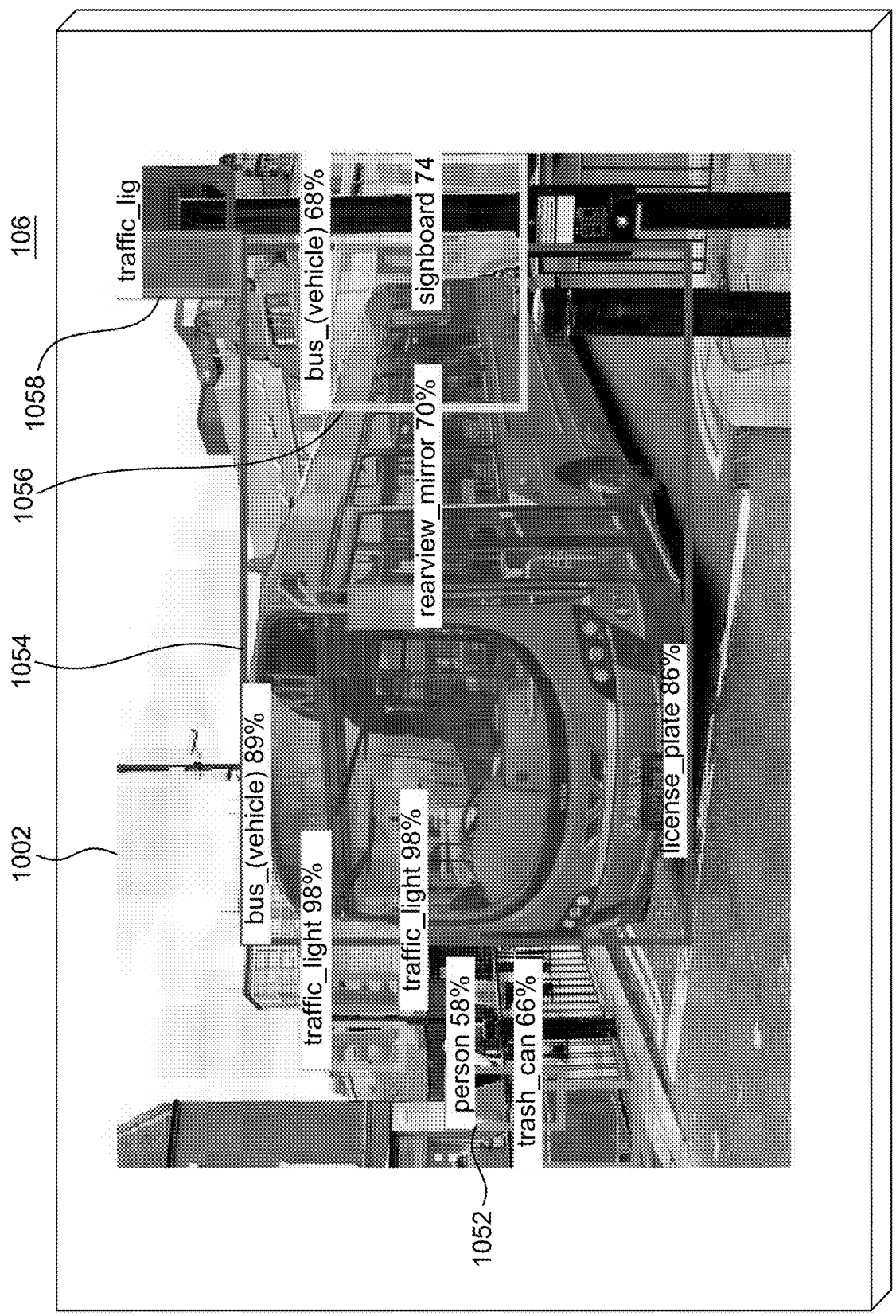
Figure 11A:
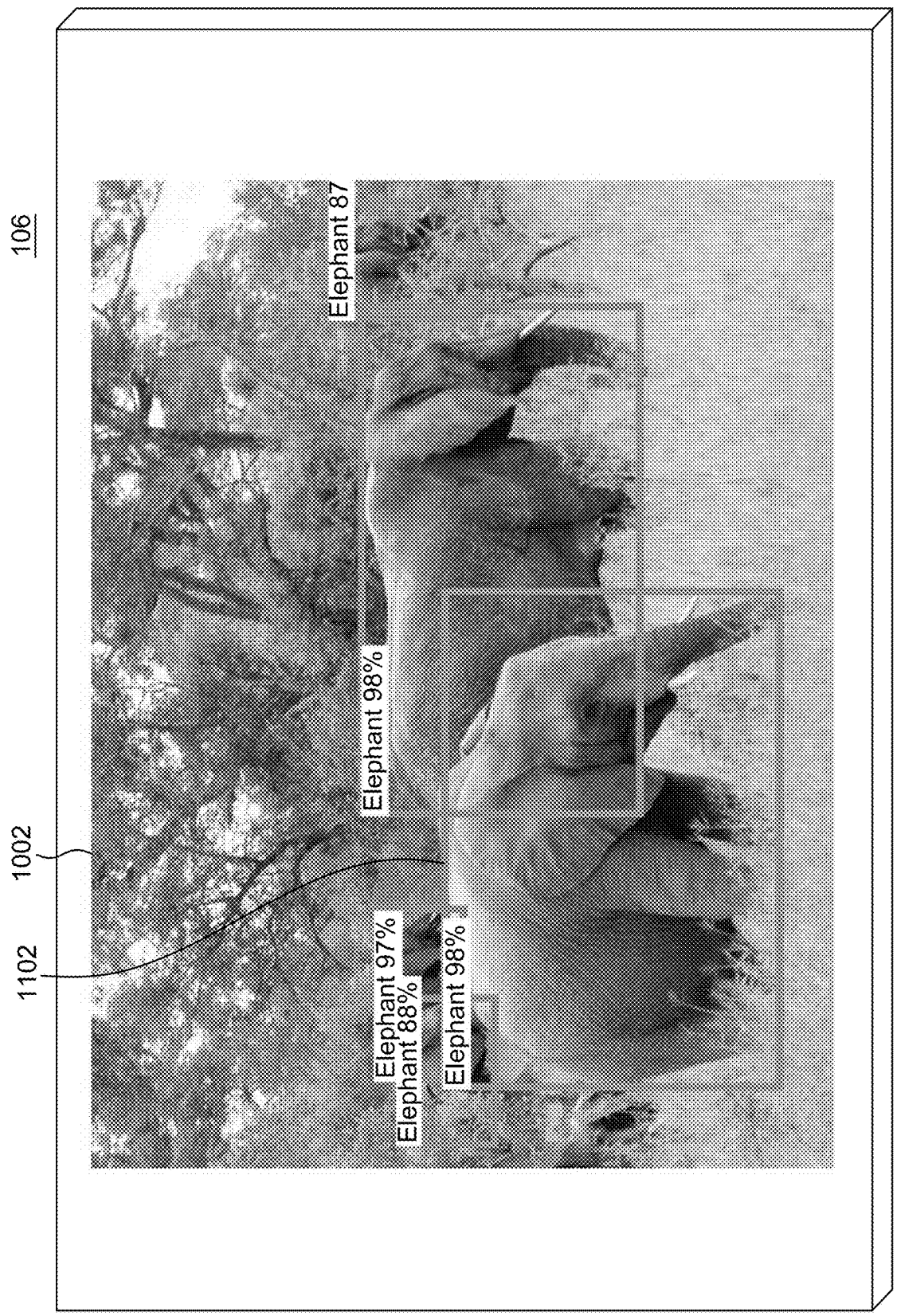
FIGS. 11A-11D illustrate a result of cross-dataset transfer of the LVIS OVD model and Objects365 dataset.
Figure 11B:
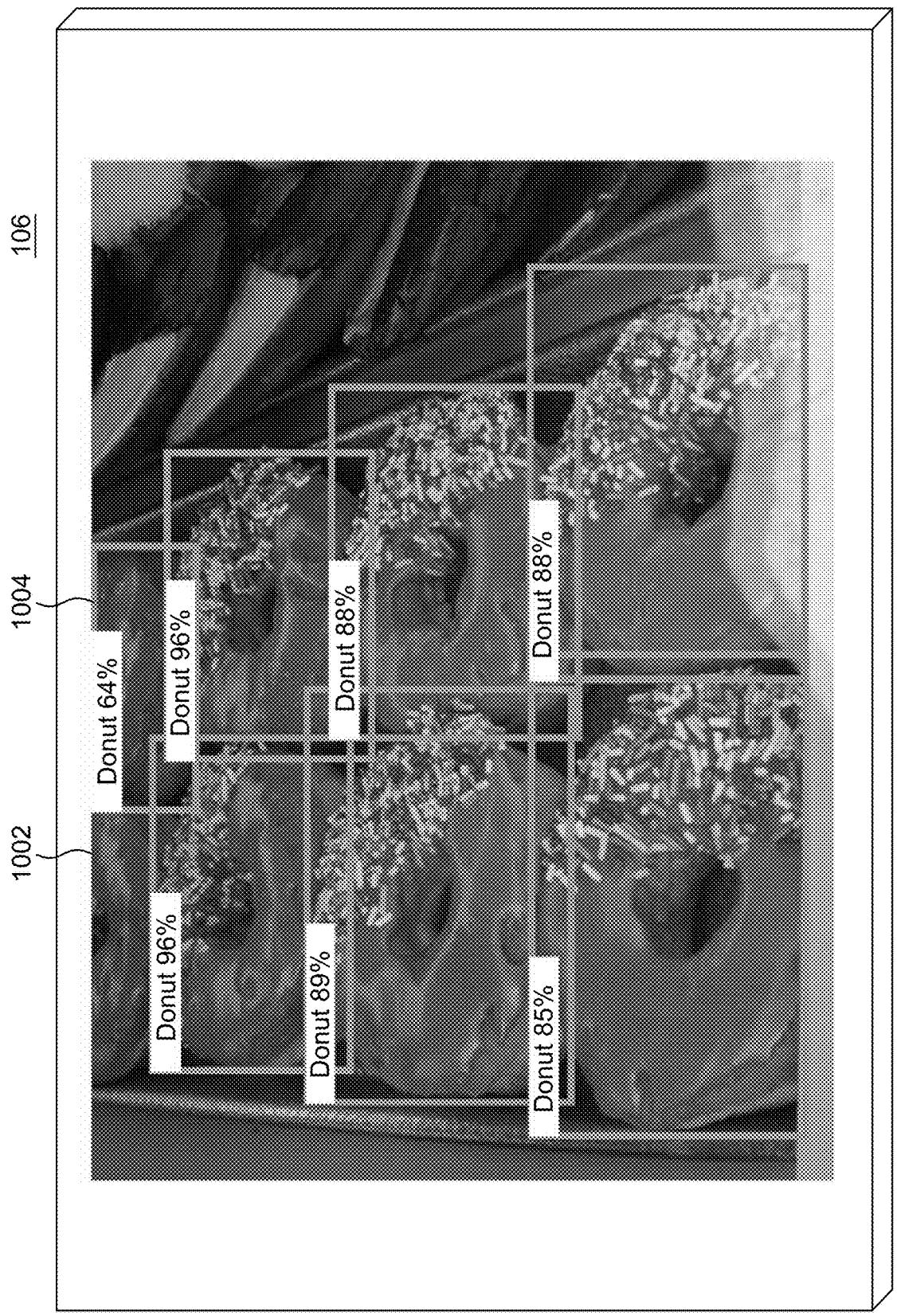
Figure 11C:
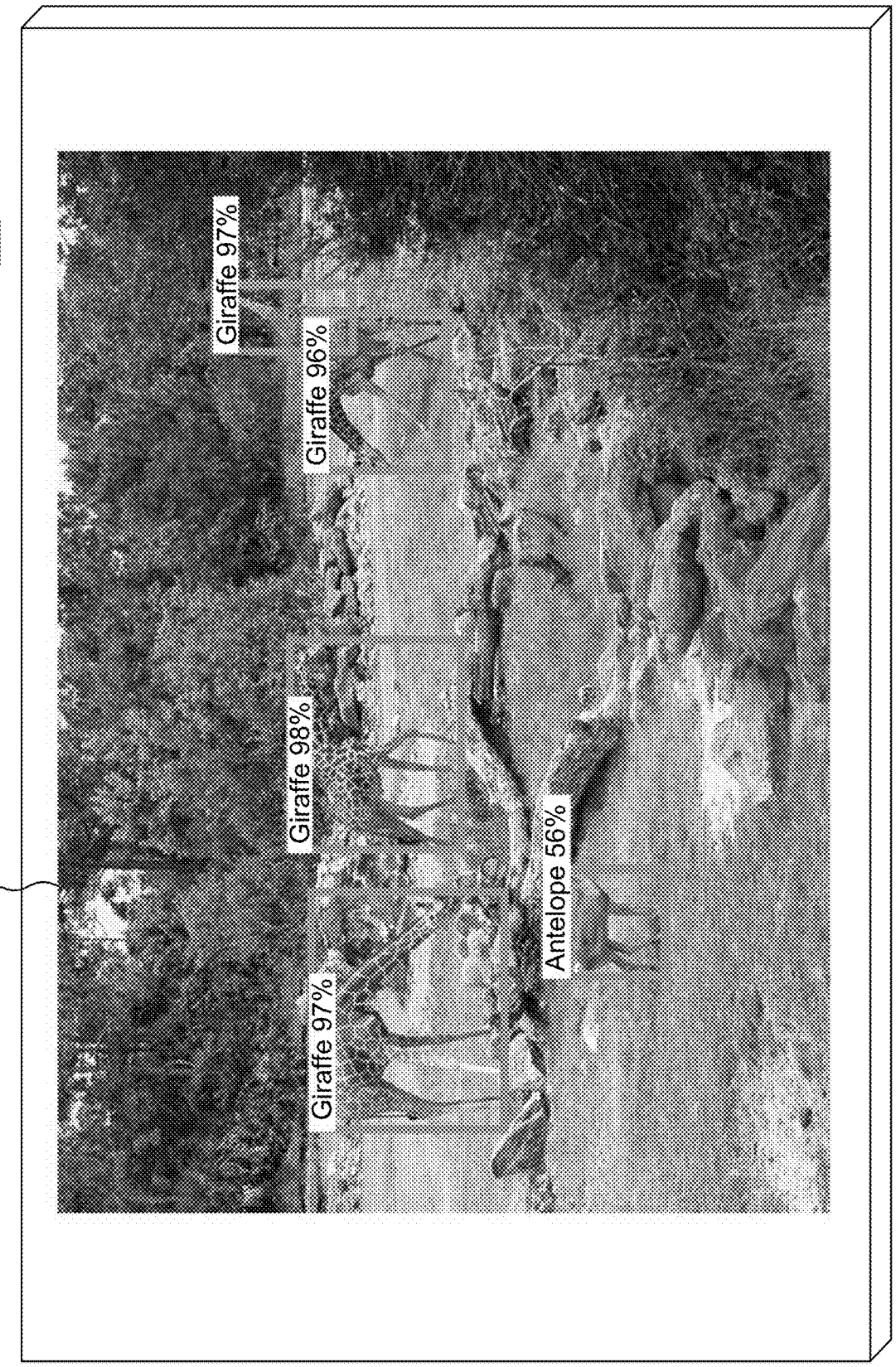
Figure 11D:
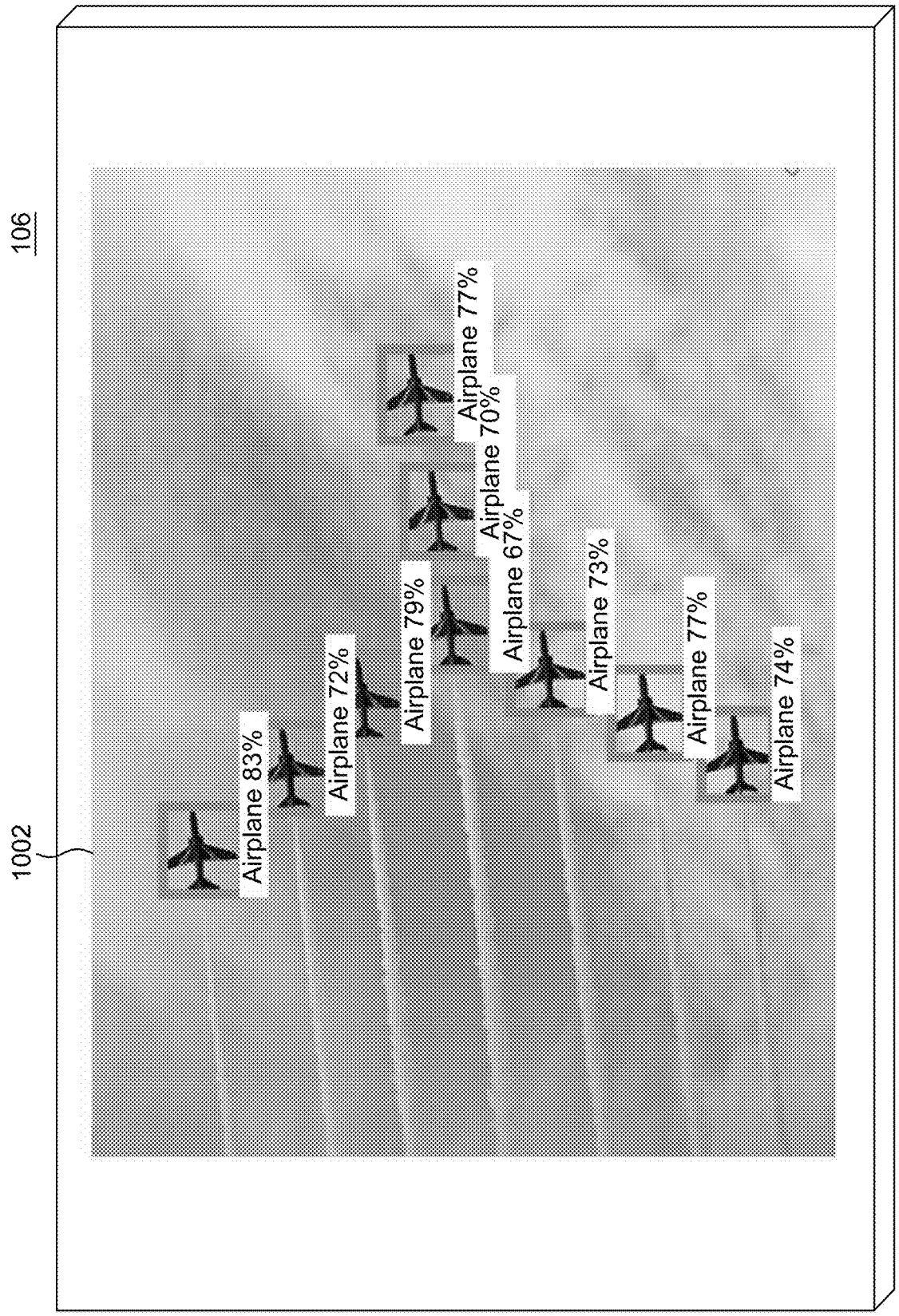
Figure 11E:
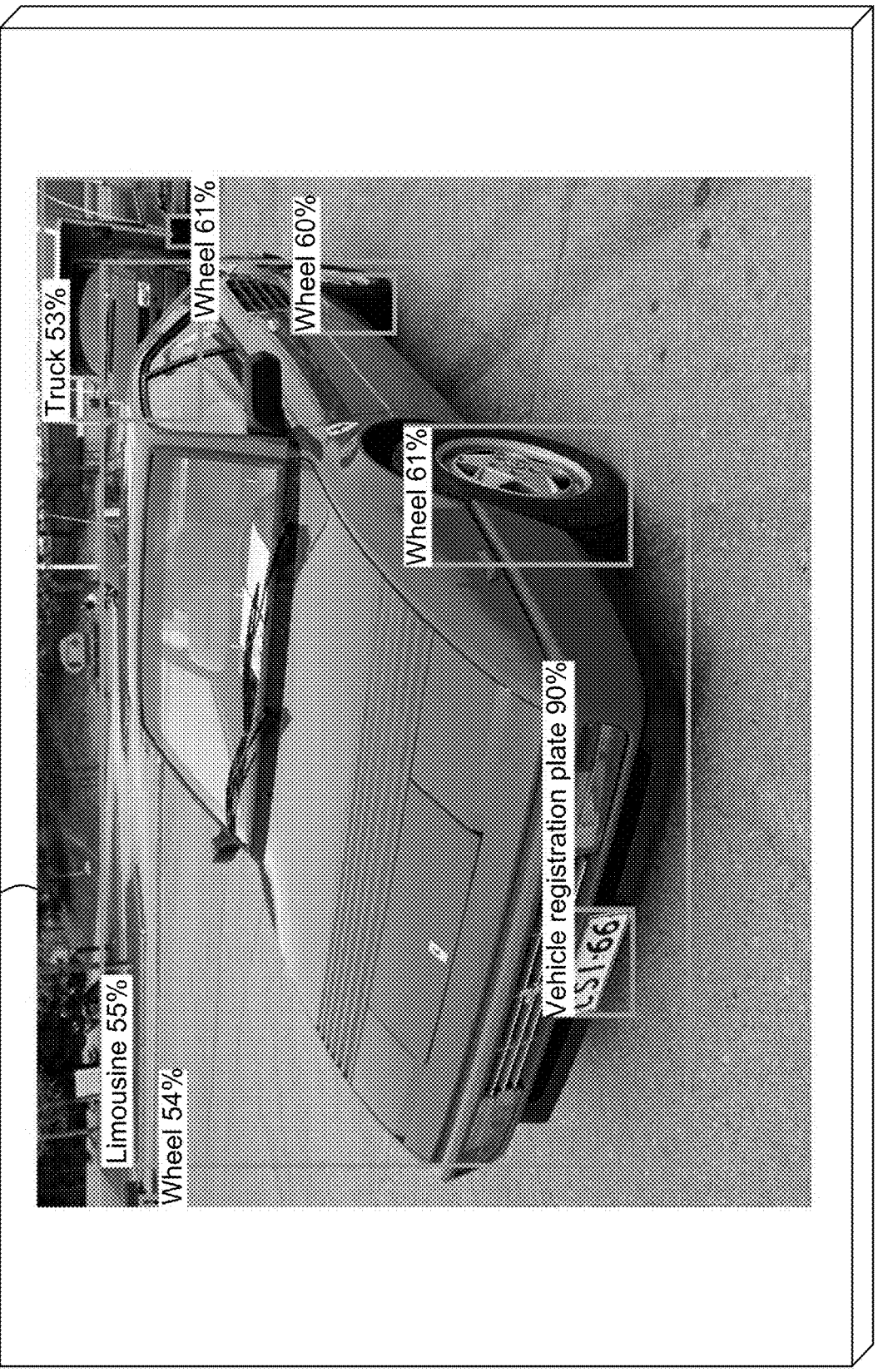
FIGS. 11E-11H illustrate a result of cross-dataset transfer of the LVIS OVD model and OpenImages dataset.
Figure 11F:
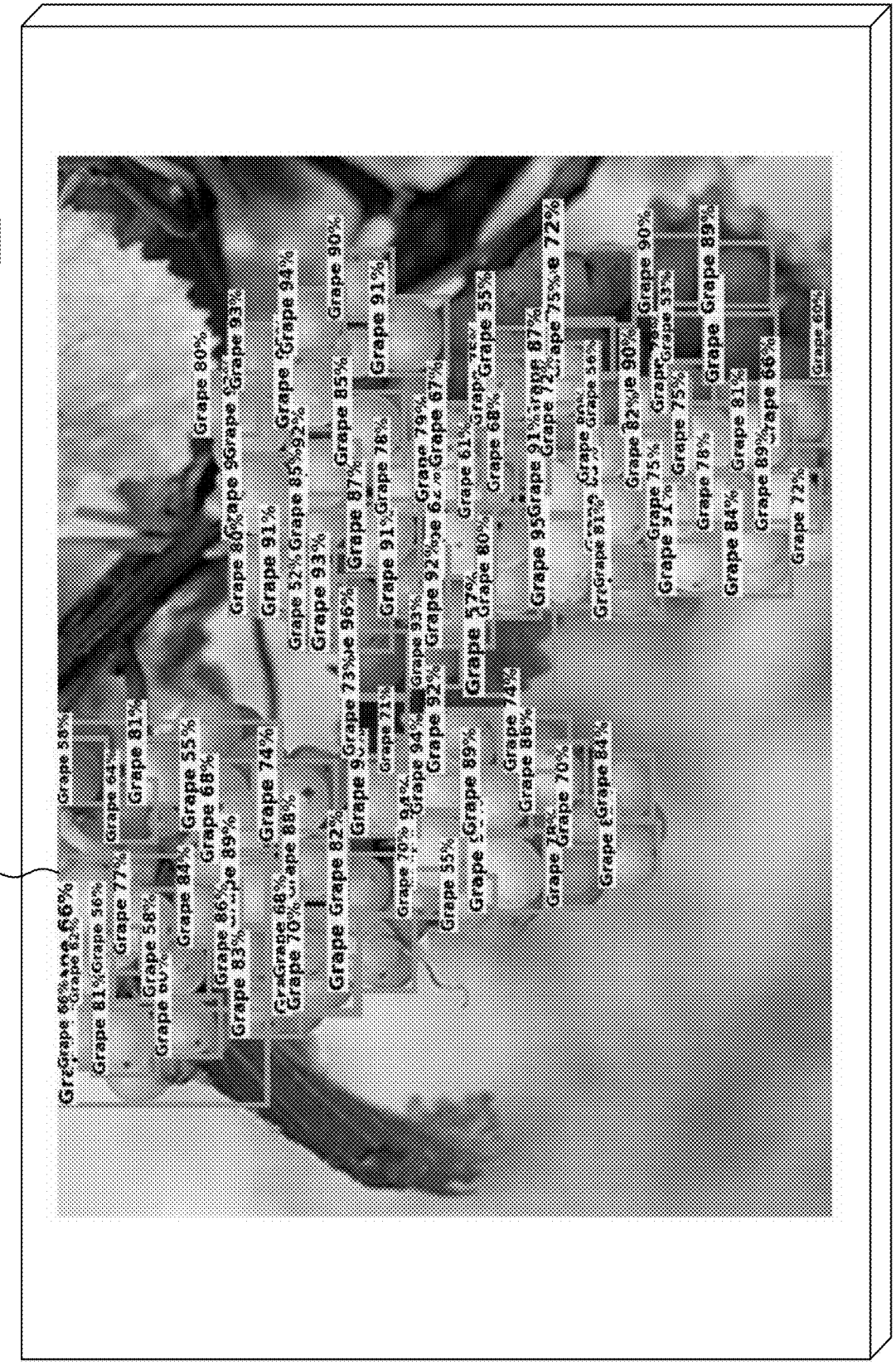
Figure 11G:
Figure 11H:
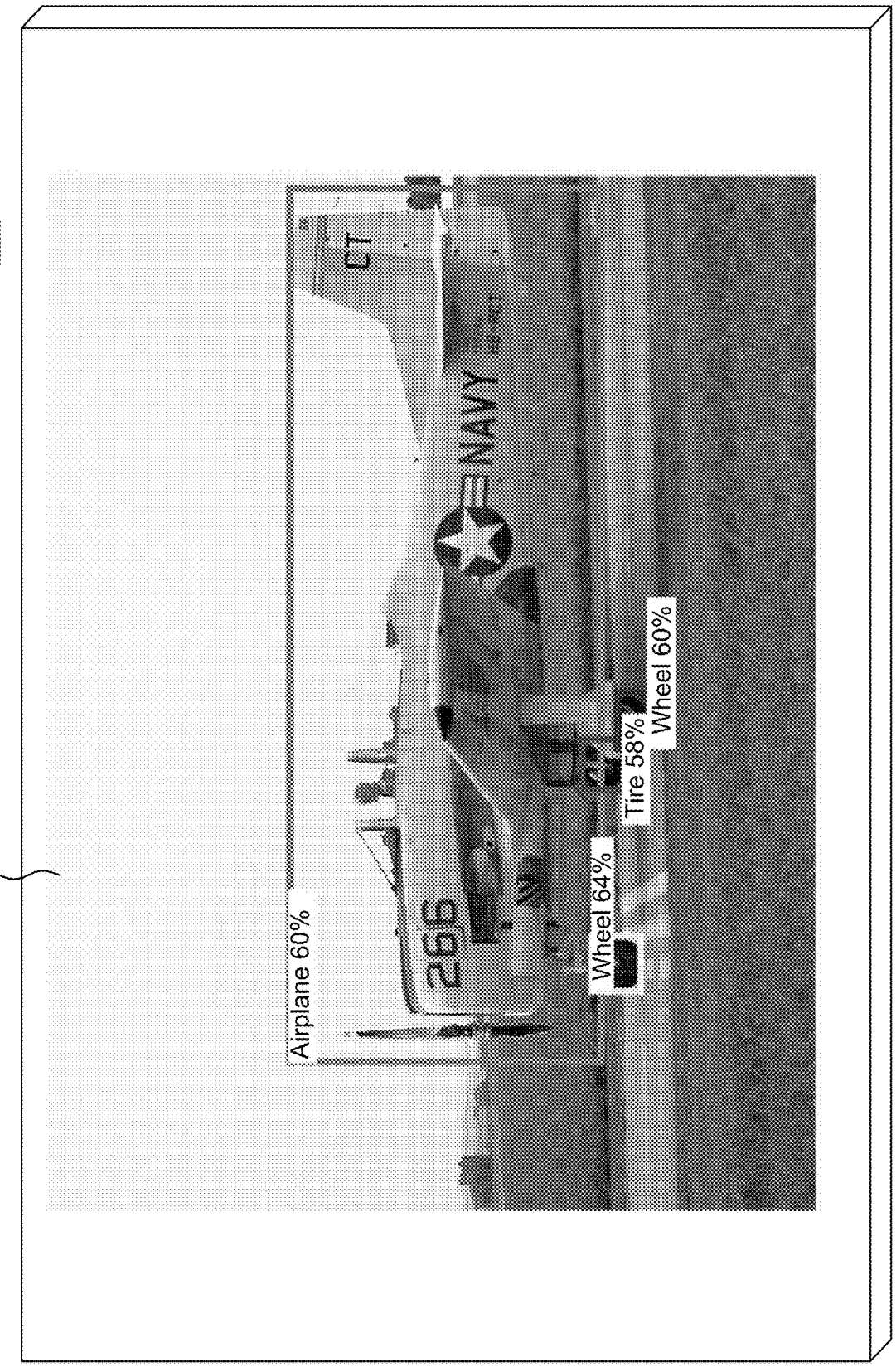

In the area of open-vocabulary, a fundamental challenge is to generalize the detector to novel classes. However, due to the daunting task of densely locating all objects in natural scenes, the existing detection datasets are of relatively smaller magnitude compared to the classification datasets, which are easier to annotate. To this end, Zhou et al. proposed to take advantage of large-scale image classification dataset during training to expand the detector's vocabulary. However, an important question is how to effectively associate the region proposals of novel objects with the corresponding labels. It is noted that the conventional approach uses heuristics such as, selecting the whole image as a single box, or just the maximum sized box from the RPN, which can ignore potential objects (FIGS. 9A, 9B).

Class-specific Proposals: A visual comparison of heuristic methods (FIG. 9A) used for visual grounding in image-level supervision, with the present method (FIG. 9B). Using heuristic approaches like selecting maximum sized box from the RPN can ignore local objects in the scene. In the present method, class-specific text queries are designed with known class labels for pseudo-labeling potential objects.

A weakly-supervised method is used to generalize the detector to novel categories by using pseudo-box labels from pretrained MViT. Pseudo bounding box labels, or pseudo-box labels, are estimated labels determined from possible class labels in a sample image.

Figure 7:
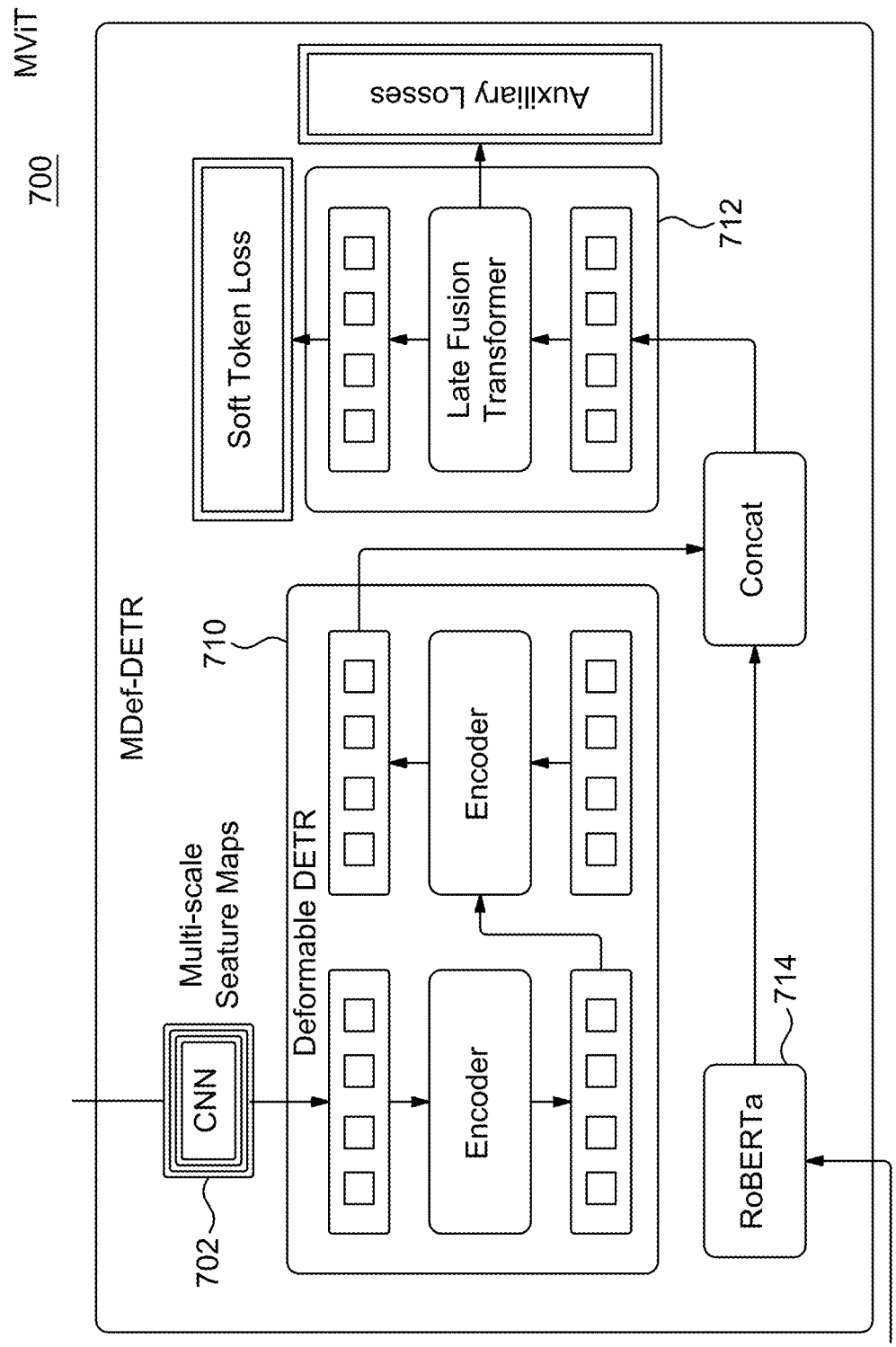
FIG. 7 is a diagram of a framework for a multi-modal vision transformer (MViT)

FIG. 7 is a diagram of a framework for a multi-modal vision transformer (MViT).

One MViT, MDef-DETR 700 (Modulated Deformable End-to-End Object Detection with Transformers), utilizes multi-scale image features with a multi-scale deformable attention module (MSDA), and uses late-fusion strategy for multi-modal fusion. The MSDA module utilizes the spatial structure of an image to sparsely sample keys for each query point. Text in the MDef-DETR model is fused after the inputs are processed through the Def-DETR encoder-decoder architecture 710 using a late fusion mechanism 712. Specifically, the query representations from a deformable decoder 710 are concatenated with the text embeddings 714, and passed through a series of transformer self-attention (SA) blocks 712. The output head is applied after each SA block and the total loss is calculated by adding all auxiliary losses.

As in Radford et al. the detector 440 is trained with a combination of detection 402 and classification 404 dataset. A batch of data is prepared by combining data from the detection dataset $\mathcal{Q}_{det}$ 402 that are exhaustively annotated with bounding-box and class labels, with data from a classification dataset $\mathcal{D}_{cls}$ 404 that only contains image-level labels. With $\mathcal{Q}_{pseudo}$ 412, pseudo-box labels are obtained on this classification dataset, which are used for image-level supervision (ILS). Specifically, provided a sample image $I \in \mathcal{D}_{cls}$, which has a total of N ground-truth class labels, in one embodiment object proposals are generated offline with the use of MViT corresponding to these weak labels. N class-specific text queries $\{t_n\}_{n=1}^{N}$ are generated with a template 'every {category}', and obtain K proposals $\{\tilde{r}_k\}_{k=1}^{K}$ and corresponding confidence scores $\{\tilde{s}_k\}_{k=1}^{K}$ for each query, $$[(\tilde{r}_1, \tilde{s}_1), (\tilde{r}_2, \tilde{s}_2), \ldots (\tilde{r}_K, \tilde{s}_K)] = \mathcal{Q}_{pseudo}(I, t_n); I \in \mathcal{D}_{cls}, n \in N.$$

The top-1 proposal with the highest confidence score is selected as the pseudo-box label for a particular category. This gives N high-quality pseudo-box labels for each image, corresponding to its N image-level category labels (FIG. 9B).

The region embeddings $\tilde{\mathcal{R}}$ are computed for proposals $\tilde{r}$ as, $$\tilde{\mathcal{R}}_n = f(\phi(\tilde{r}_{\hat{k}})), \hat{k} = \text{argmax}_k(\tilde{s}_k).$$

In the case of $\mathcal{D}_{det}$, the training follows the standard two-stage R-CNN training method. However, for $\mathcal{D}_{cls}$, only the classification loss is updated. This pseudo-max score is called $\mathcal{L}_{pms}$ loss.

$$\mathcal{L}_{pms} = \frac{1}{N} \sum_n BCE(\mathcal{V}, y\tilde{r}), \text{ where } \mathcal{V} = \cos(\tilde{\mathcal{R}}_n, \mathcal{T}) \quad (4)$$

The loss $\mathcal{L}_{pms}$ is weighted by a factor and the overall training objective with the ILS can be expressed as, $$\mathcal{L}_{ILS} = \begin{cases} \mathcal{L}_{rpn} + \mathcal{L}_{reg} + \mathcal{L}_{cls} & \text{if } \mathcal{J} \in \mathcal{D}_{det} \\ \alpha \mathcal{L}_{pms,} & \text{if } \mathcal{J} \in \mathcal{D}_{cls}. \end{cases} \quad (5)$$

Weight Transfer Function

To combine the alignment from region-based distillation with the benefits from weak supervision with pseudo-box labels, a naive approach would be to train the detector with a combination of losses: $\mathcal{L}_1$ (1), $\mathcal{L}_{irm}$ (2) and $\mathcal{L}_{pms}$ (4). However, it has been determined that a simple combination of the two approaches does not lead to complimentary benefits, and instead they compete with each other (Table 2). The additional supervision from pseudo-labels improves the generalization of the detector, while the region-based distillation works towards object-centric alignment in the language domain, thereby improving the overall performance of the detector. An object is to incorporate the benefits from the two approaches and preserve the object-centric alignment in the language domain. To this end, one embodiment incorporates a weight transfer mechanism from VL projection 426 used in region-based distillation to the weak supervision by learning a weight transfer function, $\mathcal{W}_\mathcal{T}(\cdot)$ 452. See Ronghang Hu, Piotr Dollár, Kaiming He, Trevor Darrell, and Ross Girshick. Learning to segment everything. In *Proceedings of the IEEE CVF Conference on Computer Vision and Pattern Recognition*, 2018, incorporated herein by reference in their entirety. In other words, the VL projection function $f(\cdot)$ 446 used during the weak image-level supervision 440 is explicitly conditioned on the mapping function 426 used for alignment in the distillation process 410. This way, both the transformations vi are tied together to reinforce mutual representation capability and avoid any conflict in the learned function mapping. Let the weights of the projection layer 426 in RKD and weak image-level supervision be represented as $W_D$ 426 and $W_P$ 446 respectively. The weight transfer operation is given by, $$W_P = \mathcal{W}_\mathcal{T}(W_D) = (W_{\theta_2} \rho(W_{\theta_1} W_D)); \mathcal{W}_\mathcal{T}: W_D \to W_P.$$

Here, $W_D$ 426 is kept frozen and $\mathcal{W}_\mathcal{T}$ 452 is designed as a 2-layer MLP, $W_{\theta_1}$ followed by $W_{\theta_2}$ a with LeakyReLU ($\rho$) activation with a negative slope of 0.1. Further, a skip connection across $W_P$ 446 is used by projecting the original representations using a separate 2-layer MLP (FIG. 4). The total loss here is a combination of $\mathcal{L}_{RKD}$ (Eq. 3) and $\mathcal{L}_{ILS}$ (Eq. 5) loss, given by, $$\mathcal{L} = \mathcal{L}_{rpn} + \mathcal{L}_{reg} + \mathcal{L}_{cls} + \beta_1 \mathcal{L}_1 + \beta_2 \mathcal{L}_{irm} + \alpha \mathcal{L}_{pms}.$$

Experiments

Datasets

Experiments are conducted on COCO and LVIS v1.0 under OVD setting. See Tsung-Yi Lin, Michael Maire, Serge Belongie, James Hays, Pietro Perona, Deva Ramanan, Piotr Dollár, and C Lawrence Zitnick. Microsoft coco: Common objects in context. In *The European Conference on Computer Vision*, 2014; and Agrim Gupta, Piotr Dollar, and Ross Girshick. LVIS: A dataset for large vocabulary instance segmentation. In *Proceedings of the IEEE/CVF Conference on Computer Vision and Pattern Recognition*, 2019, each incorporated herein by reference in their entirety. For evaluation, the generalized ZSD setting is used where the classifier contains both base and novel categories. Table 2 summarizes all the datasets used herein. A subset of ImageNet-21K is used having 997 overlapping LVIS categories and COCO captions dataset for ILS in LVIS and COCO experiments respectively. For the pseudo-labeling process Qpseudo, the MViT is pretrained on a Large-scale Modulated Detection (LMDet) dataset. The MViT pretraining dataset has no overlap with any of the evaluation datasets.

TABLE 2

Summary of the datasets used in the experiments.

| Dataset | Dataset Type | Task | # images |
|---|---|---|---|
| COCO | Detection | OVD | 118K |
| LVIS v1.0 | Detection | OVD | 100K |
| ImageNet-21K* | Classification | ILS in LVIS | 1.4M |
| COCO-Captions | Image-captioning | ILS in COCO | 118K |
| LMDet | Flickr30, GQA & Visual Genome | MViT Pretraining | 1.1M |
| LMDet | LMDet (excluding any overlap with novel categories) | MViT Pretraining | 0.8M |

COCO OVD: The COCO-2017 dataset is used for training and validation. The ZS splits proposed in Bansal et al. are followed, in which 48 categories are selected as base and 17 are selected as novel classes.

LVIS OVD: LVIS contains 1203 categories which are further split into frequent, common and rare categories. The frequent and common categories are combined form base classes and keep all rare classes as novel, resulting in 866 base and 337 rare classes.

Cross-transfer Datasets: To validate the adaptability of the present method, results of the LVIS trained model are evaluated and compared on OpenImages and Objects365 and COCO datasets. See Alina Kuznetsova, Hassan Rom, Neil Alldrin, Jasper Uijlings, Ivan Krasin, Jordi Pont-Tuset, Shahab Kamali, Stefan Popov, Matteo Malloci, Alexander Kolesnikov, et al. The open images dataset v4. *International Journal of Computer Vision*, 128(7): 1956-1981, 2020; Shuai Shao, Zeming Li, Tianyuan Zhang, Chao Peng, Gang Yu, Xiangyu Zhang, Jing Li, and Jian Sun. Objects365: A large-scale, high-quality dataset for object detection. In *Proceedings of the IEEE/CVF International Conference on Computer Vision*, 2019; and Lin et al., each incorporated herein by reference in their entirety.

In one embodiment, a Faster R-CNN incorporated with ResNet-50 C4 as the backbone 422 and Mask R-CNN incorporated ResNet-50 FPN as the backbone 422 for COCO and LVIS experiments respectively. ResNet-50 is a convolutional neural network that is 50 layers deep. ResNet is short for Residual Network, and can be used as a backbone for computer vision tasks. A L2 normalization is used on the region and text embeddings before computing the RKD loss 428 and final classification scores. The L2 normalization is helpful to stabilize the training. For ILS, images are sampled from detection 402 and classification 404 datasets with a ratio of 1:4. Specifically, a batch size of 16 and 64 is used for detection 402 and classification 404 datasets, respectively.

Datasets for ILS: COCO captions 402 and ImageNet-21k 404 datasets are used for the Image Level supervision (ILS) 440 on COCO and LVIS datasets respectively. The COCO captions dataset 402 uses images from COCO detection dataset and provides five captions for each image. The words in a caption are compared heuristically, with every category name in the list of categories in COCO (base+novel). Using this method, a list of positive categories is generated for each image which is used as labels for ILS. The ImageNet-21k 404 used for LVIS experiments is a large scale classification dataset containing approximately 14M images and 21K classes. See Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. Imagenet large scale visual recognition challenge. *International Journal of Computer Vision*, 115(3):211-252, 2015, incorporated herein by reference in its entirety. Categories from ImageNet-21k are used which overlaps with LVIS categories, resulting in a subset containing 997 categories.

Cross-dataset evaluation: a cross-dataset evaluation of the LVIS trained model is shown in Table 5. Validation sets of OpenImages V5 containing ~41K images and Objects365 V2 containing ~80K images are used for evaluation. The $AP_{50}$ is reported for cross-data evaluation.

Implementation Details for the COCO and LVIS Experiments

As noted above, in an embodiment COCO experiments are conducted using Faster R-CNN with a ResNet-50 backbone. The supervised-base model is trained on 48 base classes ($C_B$) for 1× schedule (~12 COCO epochs) and report box $AP_{50}$. For RKD, this model is finetuned for another 1× schedule using box-labels from CB and class-agnostic proposals from the pretrained MViT. This model is further finetuned for 1× schedule with ILS and the associated weight transfer function using class labels from COCO captions and corresponding class-specific proposals from MViT. This sums to an overall 3× training schedule.

For LVIS experiments, the embodiments use Mask R-CNN with federated loss and sigmoid cross-entropy, and report mask AP. See Kaiming et al. and Xingyi Zhou, Vladlen Koltun, and Philipp Krähenbühl. Probabilistic two-stage detection. *ar Xiv preprint ar Xiv:* 2103.07461, 2021, each incorporated herein by reference in their entirety. For RKD 410 and weight transfer 452, the same training schedules as in COCO are used and the average over three runs is reported. For comparison with Detic, the present method is applied on their strong CenterNetV2 baseline under the same settings. It uses ImageNet21K pretrained backbone with 4× schedule using large scale jittering (LSJ) augmentations. See Golnaz Ghiasi, Yin Cui, Aravind Srinivas, Rui Qian, Tsung-Yi Lin, Ekin D Cubuk, Quoc V Le, and Barret Zoph. Simple copy-paste is a strong data augmentation method for instance segmentation. In *Proceedings of the IEEE CVF Conference on Computer Vision and Pattern Recognition*, 2021, incorporated herein by reference in its entirety. All of the models are trained using a computer system configured with 8 A100 GPUs executing program instructions over an approximate training time of 9 and 6 hours for 1× schedule of COCO and LVIS datasets, respectively.

In the experiments, an SGD optimizer (short for stochastic gradient descent) is used with a weight decay of $1e^{-4}$ and a momentum of 0.9. The experiments are trained for 1× schedule with batch size of 16 and initial learning rate of 0.02 which drops by a factor of 10 at the $8^{th}$ and $11^{th}$ epoch. The temperature t is set to 50. Longer scheduled experiments use 100-1280 LSJ. The experiments use α of 0.1 to weight $\mathcal{L}_{pms}$. For computing CLIP embeddings the CLIP model ViT-B/32 is used, with input size of 224×224. The query 'a photo of a {category}' is used to compute the text embeddings for the classifier. For distillation, top 5 proposals are used from the pretrained MViT evaluated with generic query, 'all objects', generating class-agnostic proposals.

Figure 12:
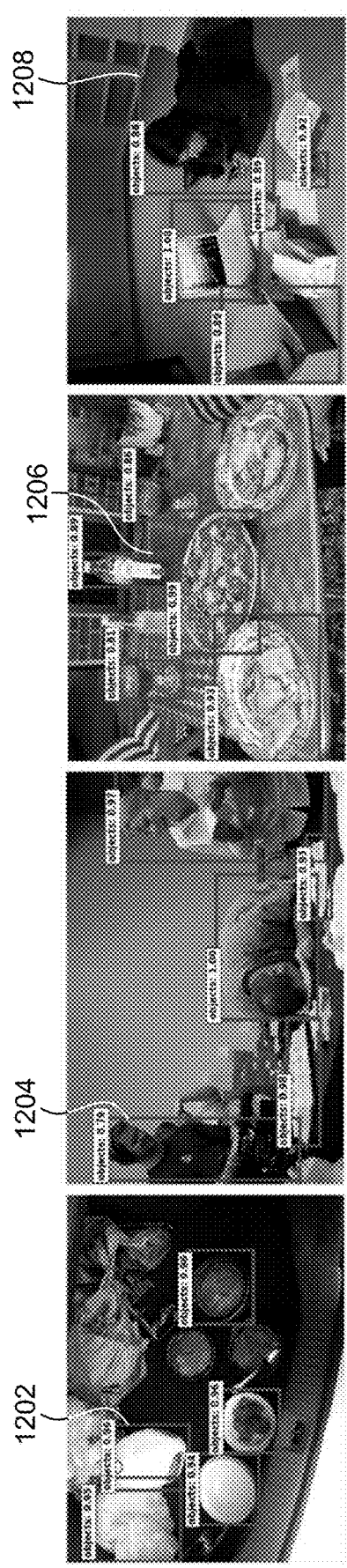
FIG. 12 illustrates class-agnostic proposals for the region-based knowledge distillation section.
Figure 13:
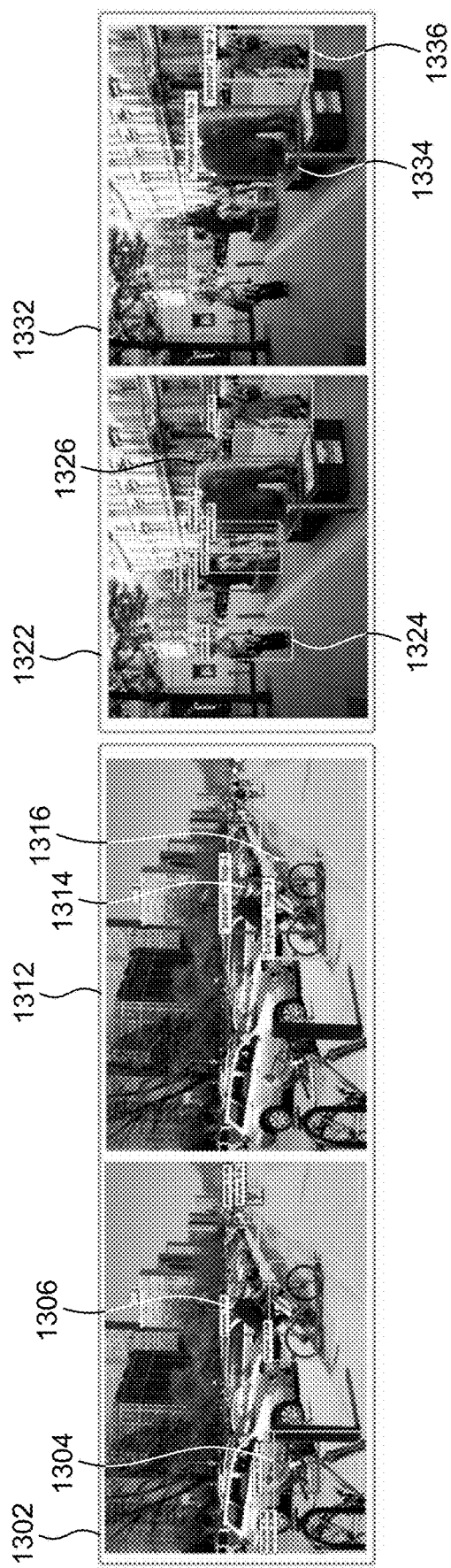
FIG. 13 illustrates class-specific proposals for image-level supervision section.

The process of generating class-agnostic and class-specific proposals using multi-modal ViTs (MViTs) is described in detail (see FIG. 12 and FIG. 13). See Maaz et al. and Aishwarya Kamath, Mannat Singh, Yann LeCun, Gabriel Synnaeve, Ishan Misra, and Nicolas Carion. Mdetr-modulated detection for end-to-end multi-modal understanding. In *Proceedings of the IEEE CVF Conference on Computer Vision and Pattern Recognition*, 2021, each incorporated herein by reference in their entirety. The process is named as pseudo labeling $Q_{pseudo}$ 412. In one embodiment, a MViT model is trained using aligned image text pairs and is capable of locating novel and base class objects using relevant human-intuitive text queries. For example, targeted text queries such as 'every person' and 'every elephant' can be used to locate all persons 1306, 1314, 1324, 1336 and all elephants 1326, 1334 in an image 1302, 1312, 1322, 1332 respectively (FIG. 13). Other queries can be used to locate other objects, such as bicycles 1304, 1316. Maaz et al. show that the MViTs encode the object-centric concepts using aligned image-caption pairs and are excellent class-agnostic object detectors. The authors designed text queries such as 'all objects' and 'all entities' and demonstrated state-of-the-art class-agnostic object detection results on multiple datasets across different domains. In the embodiments, these MViTs are used to generate class-agnostic and class-specific object proposals for region-based knowledge distillation (RKD) 410 and weak image-level supervision (ILS) 440, respectively.

Class-agnostic proposals for RKD: Class-agnostic object proposals 414 are generated from the MViT using 'all objects' text query. The generated proposals are ranked using predicted objectness scores and the top 5 proposals (including bounding boxes 1202, 1204, 1206, 1208) per image are selected for RKD as shown in FIG. 12. Next, the CLIP image-encoder 416 and the present OVD detector is used to generate embeddings corresponding to these proposals which are then used for calculating the RKD loss in Eq. 3. To save computation load and increase the training efficiency, in one embodiment the class-agnostic proposals 414 and the corresponding CLIP region embeddings are computed offline and are loaded during training. Further for LVIS experiments, images from a subset of ImageNet-21K (consisting of 997 overlapping LVIS categories) are used for RKD as well.

Class-specific proposals for ILS: class-specific proposals 414 are generated from the MViT using 'every <category name>' text query. Given the N category names present in an image, N queries of format 'every <category name>' are used to generate class-specific proposals followed by selecting top 1 proposal for each category. This provides N high-quality box proposals per image corresponding to N categories present in the image. These proposals are used to effectively enhance the detector's vocabulary using ILS during training. Further, to maintain the training efficiency of the experiments, in one embodiment these class-specific proposals 414 are computed offline and loaded during training.

In COCO experiments, weights $\beta_1$ and $\beta_2$ are set to 0.15. In LVIS, $\beta_1$ to 0.15 and $\beta_2$ are set to 0.25. These values are chosen using a randomized hyperparameter-search on the corresponding held-out datasets. The 2-layer MLP in the weight transfer function 452 has a hidden dim of 512, and a hidden dim of 1024 is used in the MLP skip connection 448 across $W_P$ 446 in FIG. 4.

Present Approach: Main Results

Table 3 shows the contribution of individual components in the present method. Building on top of the supervised-base model, RKD shows an absolute gain of 19.9 and 1.2 AP for COCO novel and base classes respectively, indicating the adaptability of image-centric CLIP embeddings for local regions. With ILS, novel class AP improves by 32.5, demonstrating generalization to novel classes and thus enlarging the detector's vocabulary. Naively combining the two approaches shows improvement, but struggles to maintain the gains from the individual components. In contrast, the present weight transfer method suitably combines the complimentary benefits of both components (FIG. 6), achieving 40.3 AP on novel classes while maintaining performance on base classes. The present weight transfer method provides complimentary gains from RKD and ILS, achieving superior results as compared to naively adding both components.

TABLE 3

Effect of individual components in the present method.

| Method | $AP_{novel}$ | $AP_{base}$ | AP |
|---|---|---|---|
| 1: Supervised (Base) | 1.7 | 53.2 | 39.6 |
| 2: Base + Region based ditillation (RKD) | 21.2 | 54.7 | 45.9 |
| 3: Base + ILS with pseudo-box (PIS) | 30.4 | 52.6 | 46.8 |
| 4: RKD + PIS | 31.5 | 52.8 | 47.2 |
| 5: RKD + PIS + Weight-transfer (Present) | 36.6 | 54.0 | 49.4 |

Open-vocabulary Detection—COCO: The present OVD results are compared with previously established methods in Table 4. In Table 4 $C_B$ and $C_N$ represent the base and novel classes, respectively. The results quoted from Zareian et al. †ViLD and present methods are trained for longer 8× schedule (shown in gray). ‡Detic is trained for another 1× for a fair comparison with the present method. For ViLD, their unified model trains ViLD-text and ViLD-Image together. For Detic, their best model is reported.

OVR-CNN learns a vision-to-language mapping with expensive pretraining. Detic uses ILS to improve detection on novel classes. The present weight transfer function is used to perform object-centric VL alignment and achieve 54.1 AP on the base classes, surpassing OVR-CNN and Detic by 8.1 AP and 0.3 AP respectively. On novel classes the present method achieves 40.3 AP, the highest novel AP achieved over all methods. In comparison with ViLD, which trains for 8× schedule (~96 epochs), the present method with same schedule provides 56.7 base AP, lagging by 2.8. On novel classes, the present method achieves 40.5 AP surpassing ViLD by a gain of 12.9. In contrast to ViLD design, the present weight transfer function allows both RKD and ILS to provide complimentary gains without any competition among the two methods.

TABLE 4

OVD results on COCO.

| Method | Supervision | $AP_{base}$ | $AP_{novel}$ | AP |
|---|---|---|---|---|
| WSDDN§ | image-level labels | 19.6 | 19.7 | 19.6 |
| CAP2Det§ | for $C_B \cup C_N$ | 20.1 | 20.3 | 20.1 |
| OVR-CNN | pretraining with captions $C_B \cup C_N$ box-level labels in $C_B$ | 46.0 | 22.8 | 39.9 |
| ViLD† | internet sourced image-test pairs box-level labels in $C_B$ | 59.5 | 27.6 | 51.3 |
| RegionCLIP | Internet sourced image-text pairs Pretraining with pseudo box-level labels Box-level labels in $C_B$ | 54.8 | 26.8 | 47.5 |

TABLE 4-continued

OVD results on COCO.

| Method | Supervision | $AP_{base}$ | $AP_{novel}$ | AP |
|---|---|---|---|---|
| Detic | internet sourced image-text pairs | 47.1 | 27.8 | 45.0 |
| Detic‡ | image-level labels for $C_B \cup C_N$ box-level labels in $C_B$ | 53.8 | 28.4 | 47.2 |
| Present | internet sourced image-text pairs | 54.0 | 36.6 | 49.4 |
| Present‡ | image-level labels for $C_B \cup C_N$ pseudo-box labels in $C_N$, box-level labels in $C_B$ | 56.6 | 36.9 | 51.5 |

Open-vocabulary Detection—LVIS: Table 5 (left) compares the present results with ViLD on LVIS benchmark and shows improvement across novel and base categories. With 3× training schedule (~36 epochs) the present method performs reasonably well compared to ViLD 32× schedule (~384 epochs), already surpassing the rare AP by 1.1 while having slightly lower performance on frequent class. Extending the present model to 8× schedule fills the gap, surpassing ViLD by 0.8 in frequent and 5.0 AP in rare classes respectively. In Table 5 (right). the present method is compared with Detic using their strong LVIS baseline that uses CenterNetV2 network. Following similar settings. their box-supervised model is finetuned using the present weight transfer method and show improvements.

TABLE 5

OVD results on LVIS. (Left): Comparison with prior work ViLD, using their unified model (ViLD-text + ViLD-Image). (Right): The comparison is shown with Detic, by building on the LVIS baseline using CenterNetV2 detector.

| Method | Epochs | $AP_r$ | $AP_c$ | $AP_f$ | AP | Method | $AP_r$ | $AP_c$ | $AP_f$ | AP |
|---|---|---|---|---|---|---|---|---|---|---|
| ViLD | 384 | 16.1 | 20.0 | 28.3 | 22.5 | Box-supervised | 16.3 | 31.0 | 35.4 | 30.0 |
| Present | 36 | 17.1 | 21.4 | 26.7 | 22.8 | Detic (Image + Captions) | 24.6 | 32.5 | 35.6 | 32.4 |
| Present | 96 | 21.1 | 25.0 | 29.1 | 25.9 | Present | 25.2 | 33.4 | 35.8 | 32.9 |

Strict Open-vocabulary Setting: Inspired from Detic, the present method is defined under the weakly-supervised open-vocabulary setting as it uses image-level labels for expanding the detector's vocabulary. However in this setting, the complete target vocabulary set is unknown, i.e., only a selected number of novel and base categories are used for ILS from ImageNet-21K in LVIS. To evaluate the present model in an extensive open-vocabulary setting, the present ILS is modified by considering a larger vocabulary. Specifically, the vocabulary is expanded to five times its size, by applying ILS from randomly sampled 5K categories from ImageNet-21k, in addition to the LVIS base classes. Table 6 compares the present strict OVD setting results with ViLD where performance slightly degrades showing sensitivity to ILS. However, a gain is achieved with longer training as in Table 5. In addition to above two settings, the present LVIS model is trained under stricter OVD conditions in a non weakly-supervised setting by only using LVIS base categories for ILS. An overall 21.71 AP is achieved which is close to the model trained using ILS from 997 categories (22.75 AP).

TABLE 6

Performance on LVIS benchmark using a strict OVD setting.

| Method | Epochs | APr | APc | APf | AP |
|---|---|---|---|---|---|
| ViLD | 384 | 16.1 | 20.0 | 28.3 | 22.5 |
| Present | 36 | 16.0 | 20.2 | 26.3 | 21.8 |

Cross-dataset evaluation performance: a cross-dataset evaluation of the present model is provided in Table 7 and compare with prior OVD works. ViLD-text and Detic-base are box-supervised baseline models for ViLD and Detic respectively. The present method builds on top of Detic-base and shows favorable results when directly transferred to cross-datasets without any dataset-specific finetuning. The present method is trained on LVIS and report AP50 on COCO, OpenImages and Objects365.

TABLE 7

Cross-dataset evaluation. †The results evaluated using official implementation.

| Method | COCO | OpenImage | Objects365 |
|---|---|---|---|
| ViLD-text | 43.4 | — | 11.1 |
| Detic-base† | 55.3 | 37.4 | 19.2 |
| ViLD | 55.6 | — | 18.2 |
| Detic† | 56.3 | 42.2 | 21.7 |
| Present | 56.6 | 42.9 | 22.3 |

FIGS. 10A-10D illustrate category detection using COCO dataset, and FIGS. 10E-10H illustrate category detection using LVIS dataset, in accordance with an exemplary aspect of the disclosure. The corresponding OVD models are used for generating the visualization 1002. For COCO, base categories are shown in 1004, 1024, 1032 and novel categories are shown in 1006, 1012, 1026, 1028. For LVIS, base classes 1034, 1036, 1038, 1044, 1046, 1052, 1054, 1056, 1058 are shown. The present method correctly detects both base and novel categories.

FIGS. 11A-11D illustrate a result of cross-dataset transfer of the LVIS OVD model and Objects365 dataset, FIGS. 11E-11H illustrate a result of cross-dataset transfer of the LVIS OVD model and OpenImages dataset. Without any finetuning, the present method provides high-quality detections 1102.

Analysis of RKD and ILS

Effect of Region-Based Knowledge Distillation (RKD)

The effect of $\mathcal{L}_1$ (Eq. 1) and $\mathcal{L}_{irm}$ (Eq. 2) RKD approach is ablated on COCO (Table 8). The results show the importance of both loss functions, where using $\mathcal{L}_1$ loss over base model with top-5 proposals from MViT improves the base and novel class by 1.9 and 15.0 AP (row-1 vs 3). Using $\mathcal{L}_{irm}$ in row-4 further improves the overall and novel class AP. To show the importance of using quality proposals in RKD, the model trained with $\mathcal{L}_1$ loss using top-5 RPN is compared vs MViT proposals (row-2 vs 3). All the models in rows 2-4 are finetuned on the base model.

Effect of Weak Image-level Supervision (ILS)

A comparison of different choices of ILS is provided in Table 9. The $\mathcal{L}_{pms}$ loss (Eq. 4) is compared with previously adopted ILS approaches (rows 2-3). See Redmon et al.; Ramanathan et al.; and Zhou et al. (2022). In row-4, class-agnostic object proposals are generated using 'all objects' text query with multi-modal ViTs (MViTs) and max-size proposals are selected for ILS. In row-5, the present ILS approach uses target specific 'every {category}' text query with MViT and selects top-1 proposal for each ILS category. The present method (row-5) shows better performance compared to other alternatives.

TABLE 8

Analysis on the present region-based KD.

| Method | $AP_{novel}$ | $AP_{base}$ | AP |
|---|---|---|---|
| 1: Supervised (Base) | 1.7 | 53.2 | 39.6 |
| 2: RPN proposals $\mathcal{L}_1$ loss | 4.0 | 54.9 | 41.6 |
| 3: MViT prop- $\mathcal{L}_1$ loss | 16.7 | 55.1 | 45.0 |
| 4: $\mathcal{L}_1$ + IRM loss | 21.2 | 54.7 | 45.9 |

TABLE 9

Analysis on the present weak IL supervision.

| Method | $AP_{novel}$ | $AP_{base}$ | AP |
|---|---|---|---|
| 1: Supervised (Base) | 1.7 | 53.2 | 39.6 |
| 2: Max-Score loss on RPN | 15.9 | 48.2 | 39.7 |
| 3: Max-Size loss on RPN | 25.9 | 51.1 | 44.5 |
| 4: Max-Size of MViT | 28.9 | 50.7 | 45.0 |
| 5: Pseudo-box on MViT | 30.4 | 52.6 | 46.8 |

Additional Ablation Experiments are Performed on LVIS

Effect of individual components: Table 10 shows the contribution of individual components in the present method on LVIS dataset. Using RKD provides improvements over the baseline in all metrics (row-1 vs 2). Using ILS mainly helps in improving rare class performance (row-1 vs 3). Simply combining two methods shows improvements over the baseline but struggles to retain the individual performances especially for common and frequent categories (row-4). The present weight transfer approach provides complimentary gains from RKD and ILS, achieving good results as compared to simply adding both components (row-4 vs 5).

The baseline Mask-RCNN model (row-1) is trained on LVIS frequent and common classes using only the box-level supervision along with the zero-shot CLIP classifier. The results indicate the effectiveness of the present region-based distillation (RKD) which explicitly aligns the image-centric CLIP embeddings to the object-centric region embeddings. The present image-level supervision (ILS) uses class-specific pseudo-labels from the pretrained multi-modal ViT, and effectively enlarges the detector's vocabulary indicated by an increase of 4.8 AP over the base model for rare categories. Further, the present weight transfer function combines the strengths of the two methods and achieves better results on the common and frequent categories, while performing on par for the rare classes compared to naively combining the two approaches (row-4 vs 5).

TABLE 10

Effect of individual components in the present method on LVIS dataset.

| Method | $AP_r$ | $AP_c$ | $AP_f$ | AP |
|---|---|---|---|---|
| 1: Supervised (Base) | 12.2 | 19.4 | 26.4 | 20.9 |
| 2: Base + Region based ditillation (RKD) | 15.2 | 20.2 | 27.3 | 22.1 |
| 3: Base + ILS with pseudo-box (PIS) | 17.0 | 21.2 | 26.1 | 22.4 |
| 4: RKD + PIS | 17.3 | 20.9 | 25.5 | 22.1 |
| 5: RKD + PIS + Weight-transfer (Present) | 17.1 | 21.4 | 26.7 | 22.8 |

Effect of RKD: Table 11 shows the effect of different loss functions ($\mathcal{L}_1$ and $\mathcal{L}_{irm}$ in Eq. 1 and Eq. 2 respectively) used in the present region-based knowledge distillation (RKD) on LVIS dataset. It shows the effectiveness of using proposals from multi-modal ViT (MViT) as compared to RPN for region-level alignment (row-2 vs 3). Using high-quality MViT proposals provides significant gains compared to using RPN proposals.

TABLE 11

Analysis on the present RKD method on LVIS.

| Method | $AP_r$ | $AP_c$ | $AP_f$ | AP |
|---|---|---|---|---|
| 1: Supervised (Base) | 12.2 | 19.4 | 26.4 | 20.9 |
| 2: RPN proposals $\mathcal{L}_1$ loss | 8.7 | 17.4 | 26.1 | 19.3 |
| 3: MViT prop- $\mathcal{L}_1$ loss | 12.4 | 20.7 | 27.7 | 22.0 |
| 4: $\mathcal{L}_1$ + IRM loss | 15.2 | 20.2 | 27.3 | 22.1 |

Further, using the inter-embedding relationship matching (IRM) loss along with L1 loss provides an overall good trade-off between rare, common and frequent class AP.

Effect of ILS: Table 11 compares the different heuristics based approaches opted for image-level supervision (ILS) versus the present method that utilizes class-specific proposals from the pretrained MViT on LVIS dataset. Selecting top-1 proposal from MViT using target specific specific queries such as 'every {category}' provides optimal performance for rare classes.

TABLE 12

Analysis on the present weak ILS on LVIS.

| Method | $AP_r$ | $AP_c$ | $AP_f$ | AP |
|---|---|---|---|---|
| 1: Supervised (Base) | 12.2 | 19.4 | 26.4 | 20.9 |
| 2: Max-Score loss on RPN | 12.8 | 18.6 | 24.7 | 20.0 |

TABLE 12-continued

Analysis on the present weak ILS on LVIS.

| Method | $AP_r$ | $AP_c$ | $AP_f$ | AP |
|---|---|---|---|---|
| 3: Max-Size loss on RPN | 14.9 | 21.3 | 26.1 | 22.1 |
| 4: Pseudo-box on MViT | 17.0 | 21.2 | 26.1 | 22.4 |

Initialization for RKD Training

It is noted that it is important to properly initialize the RKD training to gain its full advantages. Table 13 shows that training RKD from scratch (row-2) results in lower base class AP. However, initializing the RKD training from the Supervised base model recovers this loss and provides improvements over the base model. This indicates that region-based alignment is sensitive to the distribution of the features and requires mature features for effectively distilling knowledge from pretrained CLIP model. This observation is same as in where the contrastive clustering is enabled only on the mature features after a few training epochs for open-world object detection. See K J Joseph, Salman Khan, Fahad Shahbaz Khan, and Vineeth N Balasubramanian. Towards open world object detection. In *Proceedings of the IEEE/CVF Conference on Computer Vision and Pattern Recognition*, 2021, incorporated herein by reference in its entirety.

TABLE 13

Effect of initialization for RKD training on COCO dataset.

| Method | $AP_{novel}$ | $AP_{base}$ | AP |
|---|---|---|---|
| 1: Supervised (Base) | 1.7 | 53.2 | 39.6 |
| 2: RKD from scratch | 21.3 | 50.9 | 43.1 |
| 3: Base + RKD | 21.2 | 54.7 | 45.9 |

Additional Ablation Experiment

Table 14 shows the ablation on using a MLP skip connection 448 across WP 446 in FIG. 4. The skip connection is added to form a direct path for region classification using CLIP in ILS. This allows the weight transfer function to specifically focus on the residual signal in the ILS pathway. It improves the convergence and helps to attain better results in most cases on LVIS/COCO datasets.

TABLE 14

The ablation on using MLP skip connection in FIG. 4.

| | COCO | | | LVIS | | | |
|---|---|---|---|---|---|---|---|
| Method | $AP_{novel}$ | $AP_{base}$ | AP | $AP_r$ | $AP_c$ | $AP_f$ | AP |
| 1: Supervised (Base) | 1.7 | 53.2 | 39.6 | 12.2 | 19.4 | 26.4 | 20.9 |
| 2: RKD + PIS + Weight-transfer (Present) | 36.6 | 54.0 | 49.4 | 17.1 | 21.4 | 26.7 | 22.8 |
| 3: +w/o MLP skip connection | 32.5 | 53.5 | 48.0 | 18.1 | 20.9 | 26.2 | 22.5 |

Figure 14:
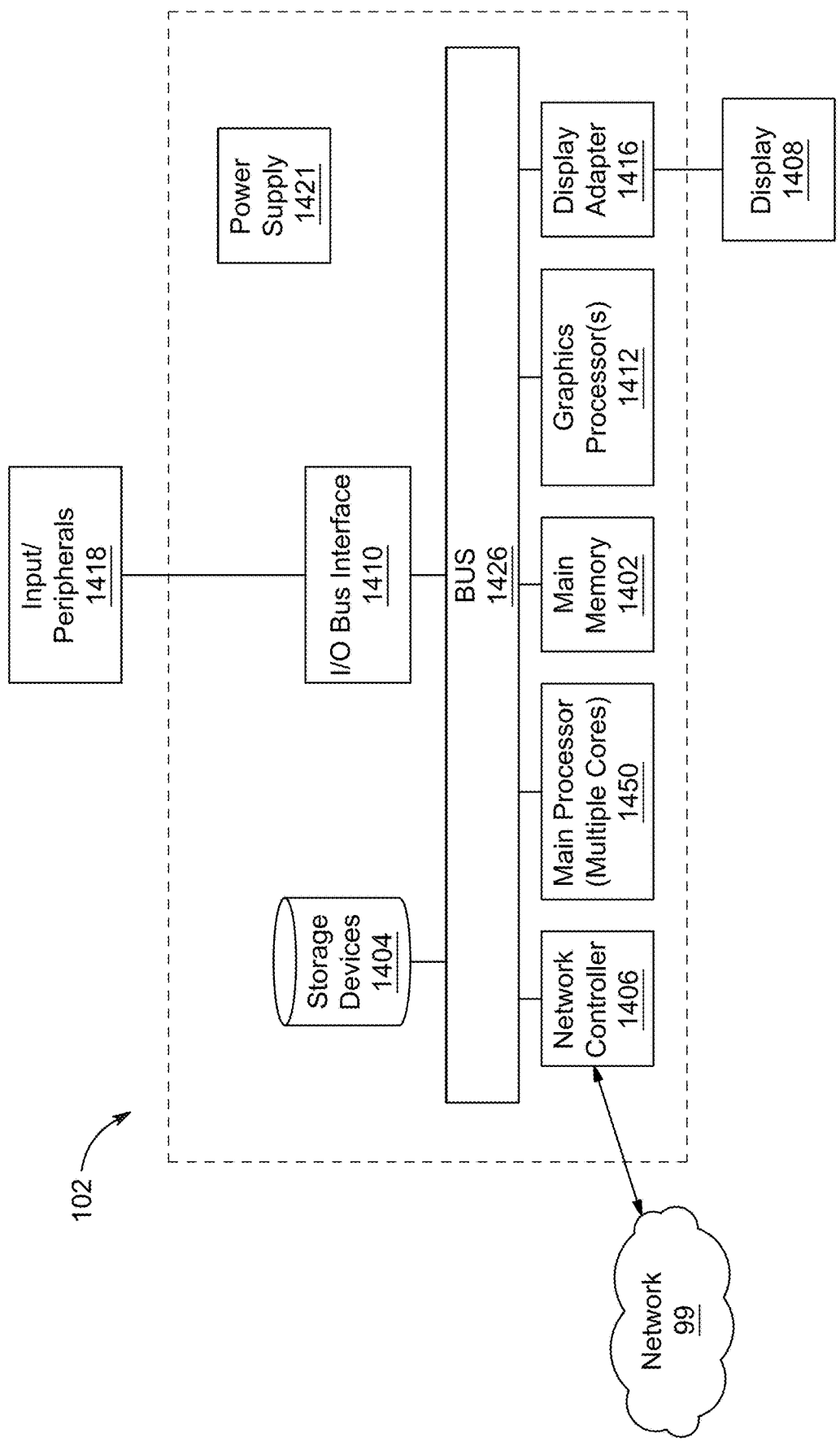
FIG. 14 is a block diagram for a computer system.

FIG. 14 is a block diagram illustrating an example computer system for implementing the machine learning training and inference methods according to an exemplary aspect of the disclosure. As noted above, machine learning models are trained using a computer system configured with 8 Nvidia A100 GPUs and program instructions stored in a computer readable storage medium (Program code is maintained in a GitHub repository). Other configurations are possible. The computer system may be a stand-alone AI workstation 102 configured with an operating system, such as Ubuntu Linux OS, Windows, a version of Unix OS, or Mac OS. The computer system 1400 may include one or more central processing units (CPU) 1450 having multiple cores. The computer system 1400 may include a graphics board 1412 having multiple GPUs, each GPU having GPU memory. The graphics board 1412, such as the A100 GPUs, may perform many of the mathematical operations of the disclosed machine learning methods. The computer system 1400 includes main memory 1402, typically random access memory RAM, which contains the software being executed by the processing cores 1450 and GPUs 1412, as well as a non-volatile storage device 1404 for storing data and the software programs. Several interfaces for interacting with the computer system 1400 may be provided, including an I/O Bus Interface 1410, Input/Peripherals 1418 such as a keyboard, touch pad, mouse, Display Adapter 1416 and one or more Displays 1408, and a Network Controller 1406 to enable wired or wireless communication through a network 99. The interfaces, memory and processors may communicate over the system bus 1426. The computer system 1400 includes a power supply 1421, which may be a redundant power supply.

In some embodiments, the computer system 1400 may include a server CPU and a graphics card by NVIDIA, in which the GPUs each have multiple CUDA cores. In some embodiments, the computer system 1400 may include a machine learning engine 1412, such as the M3 or M4, SoC currently available from Apple.

In an embodiment, a vehicle equipped with ADAS or a fully automated vehicle (self-driving vehicle) is configured with a machine learning module including processing circuitry of FIG. 14 for performing object detection. As in the exemplary vehicle of FIG. 2, the machine learning module receives images from multiple cameras 204 and detects objects (base and novel) in the images. The object detection can be performed in the present OVD detector 400. The machine learning module can execute program instructions to make high-level decisions based on the detected objects, including avoiding collisions, incorporate traffic warnings, alert drivers to possible obstacles, and assist in lane departure and lane centering.

Training of an OVD detector that is embedded in a computer system of an autonomous vehicle (self-driving vehicle or SAE level 2 or above ADAS) can be performed using a system, such as that in FIG. 1. MViTs for the OVD detector can be trained as new annotated images are added to the database 120. The OVD detector 400 can be updated as new images are received from cameras 130. The cameras 130 may be in the vehicle itself, may be distributed among multiple vehicles, and/or may be various cameras including cameras for mobile devices. The training of the OVD detector 400 can be performed in an AI workstation 102 or in a cloud service 110, or a combination as needed. In one embodiment, a vehicle may be equipped with a machine learning module that is capable of both learning and inference, such as the NVIDIA Drive processor family.

In summary, a novel framework is provided to leverage the representation and generalization capability of pre-trained multi-modal models towards improved open-vocabulary detection (OVD). Specifically, existing OVD methods use weak supervision modes that are more image-centric, rather than object-centric for the end detection task. The present method uses knowledge distillation approach together with object-level pseudo-labeling to promote region-wise alignment between visual and language representations. The present weight transfer module provides an integration mechanism to combine the benefits of knowledge distillation and object-level pseudo-labeling. Encouraging results are achieved on four popular OVD benchmarks, demonstrating sound generalization ability.

Numerous modifications and variations of the present invention are possible in light of the above teachings. It is therefore to be understood that within the scope of the appended claims, the invention may be practiced otherwise than as specifically described herein.

The invention claimed is:

1. An object detection system, comprising:
at least one camera configured to capture at least one image;
processing circuitry of a machine learning engine configured with
an object vocabulary training component having a region-based knowledge distillation stage and an image-level supervision stage joined by a weight transfer function, and an object detection inference component determined with the object vocabulary training component;
the region-based knowledge distillation stage configured to generate region embeddings from a training image having at least one bounding box for an object as input, wherein the region-based knowledge distillation stage includes:
a linear layer configured to learn a region-level vision-language mapping for projecting feature embeddings from the training image to a common feature space shared by text embeddings to obtain the region embeddings, and
a loss function configured to optimize alignment between the region embeddings and the text embeddings;
the image-level supervision stage configured to generate pseudo-box labels for the classification training image and region embeddings with the training image having bounding boxes and corresponding class labels and a classification training image having an image-level label as input, wherein the image-level supervision stage includes:
a computing component configured to determine a plurality of pseudo-box labels on the classification training image as an image-level vision-language mapping, and to compute region embeddings for the plurality of pseudo-box labels;
the weight transfer function conditions the image-level vision-language mapping on the learned region-level vision-language mapping; and
the object detection inference component configured to output the captured image annotated with a bounding box for a novel object that was not included in the training image having bounding boxes by performing object detection on the captured image.

2. The object detection system of claim 1, wherein the region-based knowledge distillation stage includes a multimodal vision transformer that determines a plurality of class-agnostic proposals for the training image having bounding boxes.

3. The object detection system of claim 2, wherein the computing component to determine a plurality of pseudo-box labels on the classification training image is the multimodal vision transformer.

4. The object detection system of claim 1, wherein the at least one camera is a camera mounted on a vehicle, and the captured image is an image of a natural scene captured by the at least one camera.

5. The object detection system of claim 1, further comprising multiple cameras, wherein the multiple cameras capture images of a natural scene for an environment surrounding a vehicle on which the multiple cameras are mounted,
wherein the object detection inference component is configured to receive the captured images as an inference input, perform object detection on the captured images, and output the captured images annotated with bounding boxes for a novel object that was not included in the training image having bounding boxes.

6. The object detection system of claim 1, further comprising multiple image sources for providing classification training images having respective image-level labels and multiple training images having respective at least one bounding box for an object,
wherein the processing circuitry of a machine learning engine is embedded in a vehicle,
wherein the object vocabulary training component is trained using the classification training images and the multiple training images having respective bounding boxes, and
wherein a number of training images having bounding boxes is substantially fewer than a number of classification training images.

7. The object detection system of claim 6, wherein the object detection inference component, derived from the trained object vocabulary training component, is configured to receive the captured image as an inference input, perform object detection on the captured image, and output the captured image annotated with bounding boxes for a novel object that was not included in the training images having respective bounding boxes.

8. The object detection system of claim 1, wherein the region-based knowledge distillation stage includes a region proposal network for generating a plurality of region proposals for the training image having bounding boxes.

9. The object detection system of claim 8, wherein the region-based knowledge distillation stage includes a region of interest head to compute pooled feature representations of the plurality of region proposals as the feature embeddings.

10. The object detection system of claim 1, wherein the region-based knowledge distillation stage includes a contrastive language-image pre-training network for generating the text embeddings.

11. A non-transitory computer readable storage medium storing program instructions, which when executed by processing circuitry of a machine learning engine including an object vocabulary training component having a region-based knowledge distillation stage and an image-level supervision stage, which are joined by a weight transfer function, and an object detection inference component determined with the object vocabulary training component, the processing circuitry performs a method comprising:
generating region embeddings, by the region-based knowledge distillation stage, from a training image having at least one bounding box for an object as input, including
learning a region-level vision-language mapping for projecting feature embeddings from the training image to a common feature space shared by text embeddings to obtain the region embeddings, and
optimizing, by a loss function, alignment between the region embeddings and the text embeddings:
generating pseudo-box labels for a classification training image and the region embeddings, by the image-level supervision stage, from the training image having bounding boxes and corresponding class labels and the classification training image having an image-level label as input, including
  determining a plurality of pseudo-box labels on the classification training image as an image-level vision-language mapping, and computing region embeddings for the plurality of pseudo-box labels;
conditioning the image-level vision-language mapping on the learned region-level vision-language mapping by the weight transfer function; and
outputting the captured image annotated with a bounding box for a novel object that was not included in the training image having bounding boxes by performing object detection on the captured image.

12. The computer readable storage medium of claim 11, further comprising:
  determining a plurality of class-agnostic proposals for the training image having bounding boxes.

13. The computer readable storage medium of claim 11, wherein the training image is received from at least one camera mounted on a vehicle, and is an image of a natural scene captured by the at least one camera.

14. The computer readable storage medium of claim 11, further comprising:
  receiving multiple training images from multiple cameras that capture images of a natural scene for an environment surrounding a vehicle on which the multiple cameras are mounted,
  and
  performing object detection on the captured images, and outputting the captured images annotated with bounding boxes for a novel object that was not included in the training image having bounding boxes.

15. The computer readable storage medium of claim 11, further comprising:
  receiving, from multiple image sources, classification training images having respective image-level labels and multiple training images having respective at least one bounding box for an object, and
  training the object vocabulary training component using the classification training images and the multiple training images having respective bounding boxes,
  wherein a number of training images having bounding boxes is substantially fewer than a number of classification training images.

16. The computer readable storage medium of claim 15, further comprising:
  receiving the captured image as an inference input,
  performing object detection on the captured image, and
  outputting the captured image annotated with bounding boxes for a novel object that was not included in the training images having respective bounding boxes.

17. The computer readable storage medium of claim 11, further comprising:
  generating a plurality of region proposals for the training image having bounding boxes.

18. The computer readable storage medium of claim 17, further comprising:
  computing pooled feature representations of the plurality of region proposals as the feature embeddings.

19. The computer readable storage medium of claim 11, further comprising:
  generating the text embeddings by a contrastive language-image pre-training network.

20. The computer readable storage medium of claim 11, wherein a multi-modal vision transformer determines a plurality of pseudo-box labels on the classification training image.

* * * * *